(12) United States Patent
Mayumi et al.

(10) Patent No.: US 11,733,803 B2
(45) Date of Patent: Aug. 22, 2023

(54) DISPLAY DEVICE INCLUDING TOUCH PANEL AND TOUCH POSITION IDENTIFYING METHOD

(71) Applicant: Sharp Kabushiki Kaisha, Sakai (JP)

(72) Inventors: Masashi Mayumi, Sakai (JP); Masayuki Hata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/788,842

(22) PCT Filed: Jan. 22, 2020

(86) PCT No.: PCT/JP2020/002039
§ 371 (c)(1),
(2) Date: Jun. 24, 2022

(87) PCT Pub. No.: WO2021/147171
PCT Pub. Date: Jul. 29, 2021

(65) Prior Publication Data
US 2023/0040117 A1 Feb. 9, 2023

(51) Int. Cl.
*G06F 3/041* (2006.01)
*G06F 3/044* (2006.01)
*G09G 3/00* (2006.01)
*G09G 3/3233* (2016.01)

(52) U.S. Cl.
CPC .......... *G06F 3/0418* (2013.01); *G09G 3/035* (2020.08); *G09G 3/3233* (2013.01); *G06F 3/0446* (2019.05); *G09G 2300/0842* (2013.01); *G09G 2310/0286* (2013.01); *G09G 2320/0233* (2013.01); *G09G 2320/0626* (2013.01); *G09G 2354/00* (2013.01)

(58) Field of Classification Search
None
See application file for complete search history.

(56) References Cited

U.S. PATENT DOCUMENTS

2015/0185951 A1   7/2015   Akai et al.

FOREIGN PATENT DOCUMENTS

JP   2015-125687 A   7/2015

*Primary Examiner* — Aneeta Yodichkas
(74) *Attorney, Agent, or Firm* — Keating & Bennett, LLP

(57) ABSTRACT

For a node in which a difference between a base sensor value which is a sensor value obtained at certain time intervals and a first reference value which is a sensor value obtained when an organic EL element does not emit light in normal temperature state is greater than a threshold value, a correction value calculation circuit stores the product of a base computing value and a third reference value as a correction value in a correction value storage unit, the third reference value representing a ratio of the first reference value to a second reference value which is a sensor value obtained when the organic EL element emits light in normal temperature state, and the base computing value being obtained by providing the product of the third reference value and the base sensor value as an input value to a base computing value calculation circuit.

15 Claims, 22 Drawing Sheets

| N1 | N2 | N3 | N4 | N5 |
| --- | --- | --- | --- | --- |
| N6 | N7 | N8 | N9 | N10 |
| N11 | N12 | N13 | N14 | N15 |

| 0.9 | 1.0 | 0.9 | 1.0 | 1.0 |
|---|---|---|---|---|
| 1.0 | 1.0 | 0.9 | 0.9 | 1.0 |
| 0.9 | 0.9 | 0.9 | 1.0 | 0.9 |

BASE SENSOR VALUE

×

| 1.1 | 1.0 | 1.1 | 1.0 | 1.0 |
|---|---|---|---|---|
| 1.0 | 1.0 | 1.1 | 1.1 | 1.0 |
| 1.1 | 1.1 | 1.1 | 1.0 | 1.1 |

FIRST CORRECTION VALUE

=

| 1.0 | 1.0 | 1.0 | 1.0 | 1.0 |
|---|---|---|---|---|
| 1.0 | 1.0 | 1.0 | 1.0 | 1.0 |
| 1.0 | 1.0 | 1.0 | 1.0 | 1.0 |

REFERENCE VALUE

Fig.17

| 8000 | 8000 | 8800 | 11200 | 12000 |
|------|------|------|-------|-------|
| 8800 | 9600 | 11200 | 12000 | 12800 |
| 9600 | 10400 | 12000 | 12800 | 13600 |

BASE SENSOR VALUE

×

| 0.95 | 0.95 | 0.85 | 0.7 | 0.65 |
|------|------|------|-----|------|
| 0.9 | 0.8 | 0.7 | 0.65 | 0.6 |
| 0.8 | 0.75 | 0.65 | 0.6 | 0.6 |

THIRD REFERENCE VALUE

×

| 1.05 | 1.05 | 1.07 | 1.02 | 1.03 |
|------|------|------|------|------|
| 1.01 | 1.04 | 1.02 | 1.03 | 1.04 |
| 1.04 | 1.03 | 1.03 | 1.04 | 0.98 |

BASE COMPUTING VALUE

SECOND CORRECTION VALUE

=

| 8000 | 8000 | 8000 | 8000 | 8000 |
|------|------|------|------|------|
| 8000 | 8000 | 8000 | 8000 | 8000 |
| 8000 | 8000 | 8000 | 8000 | 8000 |

REFERENCE VALUE

Fig.25

| 1.1 | 1.0 | 1.1 | 1.1 | 1.2 |
|-----|-----|-----|-----|-----|
| 1.1 | 1.1 | 1.3 | 1.4 | 1.3 |
| 1.3 | 1.4 | 1.5 | 1.4 | 1.5 |

DISPLAY DEVICE INCLUDING TOUCH PANEL AND TOUCH POSITION IDENTIFYING METHOD

TECHNICAL FIELD

The following disclosure relates to a display device (e.g., an organic EL display device) including a touch panel and a method of identifying a touch position in the display device.

BACKGROUND ART

In recent years, an organic EL display device including pixel circuits including organic EL elements has been put to practical use. The organic EL element is also called an organic light-emitting diode (OLED), and is a self-emissive display element that emits light at luminance determined based on current flowing therethrough. As such, since the organic EL element is a self-emissive display element, the organic EL display device can easily achieve slimming down compared with a liquid crystal display device that requires a backlight, a color filter, and the like. Regarding such an organic EL display device, a technique for providing a touch panel on the front side of a panel (organic EL panel) has also been put to practical use. Examples of organic EL display devices including a touch panel include smartphones and tablet terminals.

In an organic EL display device including a touch panel, in order to perform touch detection (a determination as to whether there is a touch on the touch panel and identification of a touch position when there has been a touch), a sensor value (digital capacitance value) that changes depending on the degree of approach of a detection object (e.g., a finger) to the touch panel is obtained. However, the sensor value is influenced by external temperature changes or heat generation inside the device. Thus, upon performing touch detection, a correction process based on temperature is performed. By this, even if there are fluctuations in temperature, touch detection is performed normally.

Note that in relation to this subject, Japanese Laid-Open Patent Publication No. 2015-125687 discloses an invention of a touch detection device that can optimize an adjustment parameter for adjusting variations in detection data (sensor value), according to environmental fluctuations.

PRIOR ART DOCUMENT

Patent Document

[Patent Document 1] Japanese Laid-Open Patent Publication No. 2015-125687

SUMMARY

Problems to be Solved by the Invention

In recent years, development of a bendable (foldable) organic EL display device (an organic EL display device including a touch panel is taken a look at in the following description) such as that shown in FIG. 28 has been progressing. In such an organic EL display device, each of layers included in the panel is made thin so that the panel is bendable. A general organic EL display device has a panel thickness of, for example, about 1300 μm, but a bendable organic EL display device has a panel thickness of, for example, about 300 μm. As such, the panel thickness of the bendable organic EL display device is about one-quarter of the panel thickness of the general organic EL display device.

Meanwhile, normally, an organic EL display device adopts a configuration in which a support film having a graphite sheet adhered thereto is provided on the back side of a panel for the purpose of heat dissipation. However, a bendable organic EL display device requires slimming down and thus is provided with no support film or provided with a support film only on a part of the back side of a panel thereof. Hence, heat dissipation is not sufficiently performed. Therefore, regarding the bendable organic EL display device, heat generation is a large problem. Specifically, due to the influence of heat generation, erroneous operation in touch detection or variations in luminance occur.

In a case in which a support film is not provided, generally, temperature is low in a region away from a region where a driver is mounted, and the closer to the region where the driver is mounted, the higher the temperature. For example, there is a case in which a difference in temperature between both edges of a panel reaches about 25 degrees. Since the above-described sensor value increases as temperature increases, the amount of shift in sensor value (a difference between a sensor value obtained at normal temperature and a sensor value obtained after temperature increase) increases for a region with a larger degree of temperature increase. When the temperature increase in a panel plane is non-uniform, the amount of shift in sensor value in the panel plane is also non-uniform, and thus, the above-described correction process based on temperature cannot be performed normally. As a result, noise increases, hindering normal touch detection. In addition, since current flows more easily as temperature increases, the luminance of an organic EL element is high in a region where temperature increases. Thus, when the temperature increase in the panel plane is non-uniform, the ease of current flow is non-uniform, causing variations in luminance. Note that a temperature distribution in the panel plane also changes depending on a display pattern.

As above, in the bendable organic EL display device, erroneous operation in touch detection caused by non-uniformity of temperature increase in the panel plane occurs. Note that in a panel that is remarkably increased in size, even if a support film is provided, variations in temperature increase in a panel plane can occur.

Hence, an object of the following disclosure is to implement a display device that can accurately identify a touch position even if the temperature increase in a panel plane is non-uniform.

Means for Solving the Problems

A display device according to some embodiments of the present disclosure is a display device that includes a display panel having a display element configured to emit light at luminance determined based on an amount of current supplied to the display element, and a touch panel provided on a front side of the display panel, the display device including:

a sensor value obtaining circuit configured to obtain a sensor value that changes depending on a degree of approach of a detection object to the touch panel;

a touch position identifying circuit configured to identify a touch position, the touch position being a position in which the detection object touches the touch panel; and a correction value calculation circuit configured to determine a correction value for correcting the sensor value so that influence by temperature is removed when the touch position identifying circuit identifies the touch position, wherein the sensor value obtaining circuit obtains in advance a first reference value and a second reference value, the first reference value being a sensor value obtained when the display element does not emit light in normal temperature state, and the second reference value being a sensor value obtained when the display element emits light in normal temperature state, the correction value calculation circuit includes:
  a correction value storage unit configured to store the correction value for each node, the node being a unit for obtaining the sensor value; and
  a base computing value calculation circuit configured to determine, for each node, a base computing value representing a ratio of a predetermined reference value to an input value, an upper limit value and a lower limit value are set for the base computing value determined by the base computing value calculation circuit, the correction value calculation circuit:
  stores, for a node in which a difference between a base sensor value and the first reference value is less than a predetermined threshold value, a base computing value obtained by providing the base sensor value as the input value to the base computing value calculation circuit as the correction value in the correction value storage unit, the base sensor value being a sensor value obtained at certain time intervals by the sensor value obtaining circuit; and
  stores, for a node in which a difference between a base sensor value and the first reference value is greater than the threshold value, a product of a base computing value and a third reference value as the correction value in the correction value storage unit, the third reference value representing a ratio of the first reference value to the second reference value, and the base computing value being obtained by providing a product of the third reference value and the base sensor value as the input value to the base computing value calculation circuit, and the touch position identifying circuit identifies the touch position based on values obtained by correcting, by using correction values stored in the correction value storage unit, sensor values obtained most recently by the sensor value obtaining circuit.

A touch position identifying method according to some embodiments of the present disclosure is a touch position identifying method for identifying a touch position in a display device including: a display panel having a display element configured to emit light at luminance determined based on an amount of current supplied to the display element; a touch panel provided on a front side of the display panel; and a sensor value obtaining circuit configured to obtain a sensor value that changes depending on a degree of approach of a detection object to the touch panel, the touch position being a position in which the detection object touches the touch panel, wherein the display device includes:
  a correction value storage unit configured to store, for each node, a correction value for correcting the sensor value so that influence by temperature is removed when the touch position is identified, the node being a unit for obtaining the sensor value; and
  a base computing value calculation circuit configured to determine, for each node, a base computing value representing a ratio of a predetermined reference value to an input value, an upper limit value and a lower limit value are set for the base computing value determined by the base computing value calculation circuit, the sensor value obtaining circuit obtains in advance a first reference value and a second reference value, the first reference value being a sensor value obtained when the display element does not emit light in normal temperature state, and the second reference value being a sensor value obtained when the display element emits light in normal temperature state, the touch position identifying method includes:
  a determining step of determining, for each node, whether a difference between a base sensor value and the first reference value is less than a predetermined threshold value, the base sensor value being a sensor value obtained at certain time intervals by the sensor value obtaining circuit;
  a correction value calculating step of calculating the correction value and storing the calculated correction value in the correction value storage unit;
  a sensor value correcting step of correcting, by using correction values stored in the correction value storage unit, sensor values obtained most recently by the sensor value obtaining circuit; and
  a position calculating step of calculating the touch position, based on sensor values after correcting in the sensor value correcting step, in the correction value calculating step, for a node in which a difference between the base sensor value and the first reference value is determined to be less than the threshold value in the determining step, a base computing value obtained by providing the base sensor value as the input value to the base computing value calculation circuit is stored as the correction value in the correction value storage unit, and in the correction value calculating step, for a node in which a difference between the base sensor value and the first reference value is determined to be greater than the threshold value in the determining step, a product of a base computing value and a third reference value is stored as the correction value in the correction value storage unit, the third reference value representing a ratio of the first reference value to the second reference value, and the base computing value being obtained by providing a product of the third reference value and the base sensor value as the input value to the base computing value calculation circuit.

Effects of the Invention

According to some embodiments of the present disclosure, the correction value calculation circuit that determines a correction value for touch detection includes the correction value storage unit that stores a correction value for each node; and the base computing value calculation circuit that determines a base computing value representing a ratio of a reference value to an input value. Here, an upper limit value and a lower limit value are set for the base computing value determined by the base computing value calculation circuit. For a node in which a difference between a base sensor value which is a sensor value obtained at certain time intervals and a first reference value which is a sensor value obtained when a display element does not emit light in normal temperature state is less than a predetermined threshold value (i.e., a node with a low temperature), a correction value is determined by providing the base sensor value as an input value to the base computing value calculation circuit. At this time, regarding calculation of the base computing value, an overflow does not occur. For a node in which a difference between a base sensor value and a first reference value is greater than the predetermined threshold value (i.e., a node with a high temperature), first, the product of a third reference value and the base sensor value is determined, the third reference value representing a ratio of the first reference value to a second reference value which is a sensor value obtained when the display element emits light in normal temperature state. Then, the product is provided as an input value to the base computing value calculation circuit, by which a base computing value is determined, and the base computing value is multiplied by the third reference value, by which a correction value is determined. At this time, the input value provided to the base computing value calculation circuit is a value obtained by removing the influence of temperature increase inside the device from the base sensor value. Thus, regarding calculation of the base computing value, an overflow does not occur. By the above-described configuration, regardless of the temperature of each node, for all nodes, a suitable correction value is determined so that a correction process for touch detection is performed normally. Therefore, a touch position is accurately identified. As above, a display device is implemented that can accurately identify a touch position even if temperature increase in a panel plane is non-uniform.

BRIEF DESCRIPTION OF THE DRAWINGS

FIG. 17 is a diagram for describing second correction values in the first embodiment.

FIG. 25 is a diagram showing an example of an adjustment factor for each node in the second embodiment.

MODES FOR CARRYING OUT THE INVENTION

With reference to the accompanying drawings, embodiments will be described below. Note that in each embodiment, an organic EL display device will be described as an example of a display device including a touch panel.

1. First Embodiment

<1.1 Overall Configuration>

Figure 2:
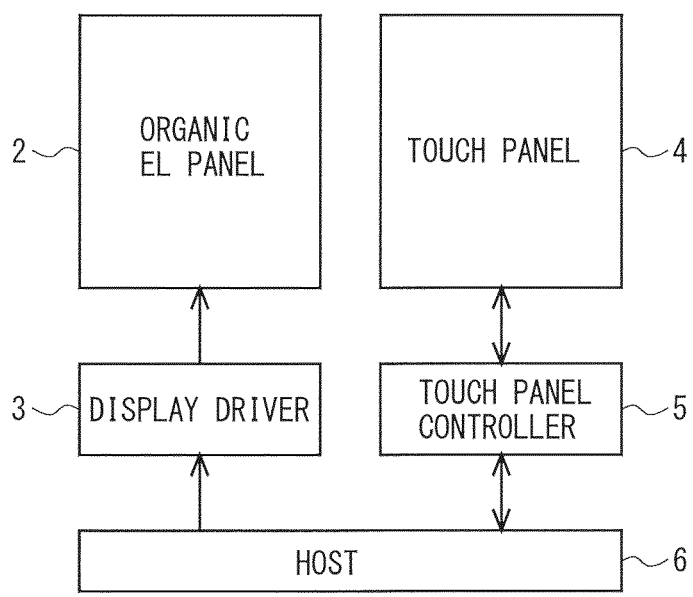
FIG. 2 is a block diagram showing an overall configuration of an organic EL display device according to the first embodiment.

FIG. 2 is a block diagram showing an overall configuration of an organic EL display device according to a first embodiment. The organic EL display device includes an organic EL panel (display panel) 2, a display driver (display drive circuit) 3, a touch panel 4, a touch panel controller 5, and a host (main control circuit) 6. The touch panel 4 is provided on the front side of the organic EL panel 2. The organic EL panel 2 and the touch panel 4 have flexibility. That is, the organic EL display device according to the present embodiment is a bendable (foldable) ultrathin display with a touch panel.

The touch panel controller 5 outputs a drive signal for performing touch detection to the touch panel 4. The touch panel 4 detects a touch or approach of a detection object such as a finger of a user (an operator of the organic EL display device) or a touch pen, and the touch panel controller 5 obtains sensor values (digital capacitance values) as results of the detection. Then, information on a touch position identified based on the sensor values is transmitted from the touch panel controller 5 to the host 6. The host 6 transmits a control signal to the display driver 3, depending on the touch position. The host 6 also transmits image data to the display driver 3. The display driver 3 drives scanning lines and data lines in a display unit in the organic EL panel 2 so that a desired image is displayed on the display unit.

<1.2 Components for Image Display>

Figure 3:
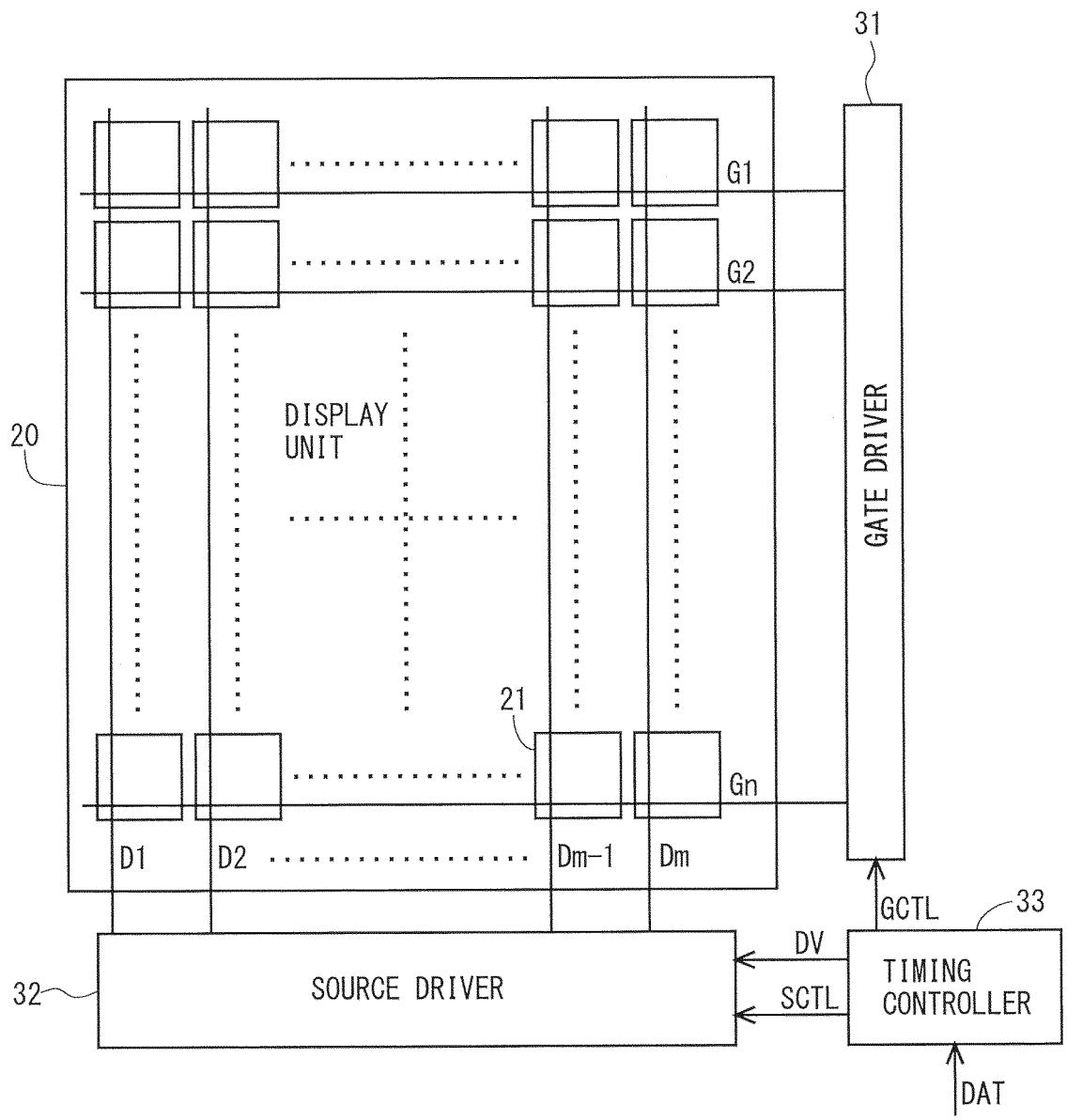
FIG. 3 is a block diagram showing a configuration for image display in the first embodiment.

FIG. 3 is a block diagram showing a configuration for image display. Regarding FIG. 3, a display unit 20 is a component in the organic EL panel 2, and a gate driver 31, a source driver 32, and a timing controller 33 are components in the display driver 3. Note that the gate driver 31 may be provided inside the organic EL panel 2.

The display unit 20 includes n scanning lines G1 to Gn, m data lines D1 to Dm, and (m×n) pixel circuits 21. The scanning lines G1 to Gn are arranged in parallel to each other. The data lines D1 to Dm are arranged in parallel to each other. The scanning lines G1 to Gn are orthogonal to the data lines D1 to Dm. The (m×n) pixel circuits 21 are arranged so as to correspond to intersecting points of the scanning lines G1 to Gn and the data lines D1 to Dm. Note that in the display unit 20 there are also disposed a high-level power supply line that supplies a high-level power supply voltage ELVDD and a low-level power supply line that supplies a low-level power supply voltage ELVSS (not shown in FIG. 3).

The timing controller 33 receives image data DAT transmitted from the host 6, and outputs digital video signals DV, gate control signals GCTL that control operation of the gate driver 31, and source control signals SCTL that control operation of the source driver 32. The gate control signals GCTL include a gate start pulse signal, a gate clock signal, etc. The source control signals SCTL include a source start pulse signal, a source clock signal, a latch strobe signal, etc.

The gate driver 31 is connected to the n scanning lines G1 to Gn. The gate driver 31 applies scanning signals to the n scanning lines G1 to Gn, based on the gate control signals GCTL outputted from the timing controller 33.

The source driver 32 is connected to the m data lines D1 to Dm. The source driver 32 includes an m-bit shift register, a sampling circuit, a latch circuit, m D/A converters, and the like, which are not shown. The shift register includes m cascade-connected registers. The shift register sequentially transfers a pulse of the source start pulse signal supplied to a register at an initial stage, from an input terminal to an output terminal based on the source clock signal. Along with the transfer of the pulse, a sampling pulse is outputted from each stage of the shift register. Based on the sampling pulse, the sampling circuit stores a digital video signal DV. The latch circuit captures and holds digital video signals DV for one row which are stored in the sampling circuit, in accordance with the latch strobe signal. The D/A converters are provided so as to correspond to the respective data lines D1 to Dm. The D/A converters convert the digital video signals DV held in the latch circuit into analog voltages. The converted analog voltages are simultaneously applied as data signals to all data lines D1 to Dm.

In the above-described manner, the scanning signals are applied to the n scanning lines G1 to Gn and the data signals are applied to the m data lines D1 to Dm, by which an image based on the image data DAT is displayed on the display unit 20.

Figures 4, 5:
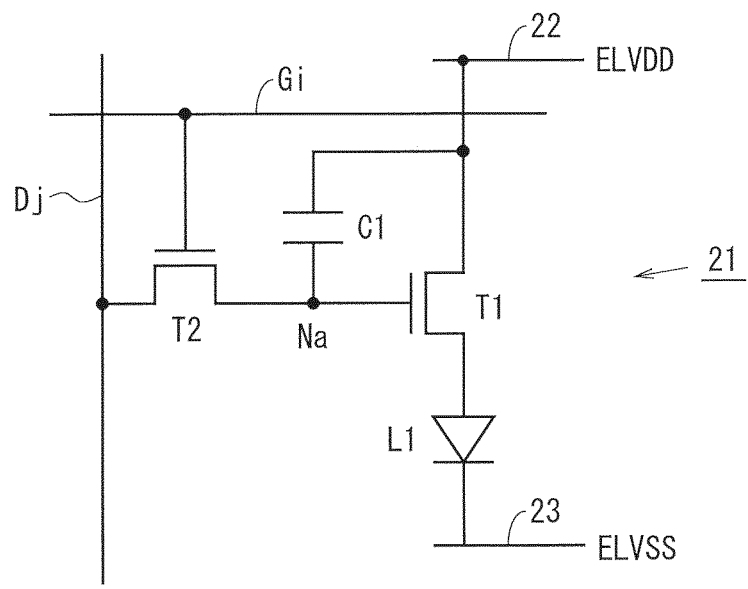
FIG. 4 is a circuit diagram showing an exemplary configuration of a pixel circuit in an ith row and a jth column in the first embodiment.
FIG. 5 is a diagram schematically showing nodes included in a touch panel in the first embodiment.

FIG. 4 is a circuit diagram showing an exemplary configuration of a pixel circuit 21 in an ith row and a jth column. As shown in FIG. 4, the pixel circuit 21 includes two transistors (a drive transistor T1 and a write control transistor T2), one capacitance C1, and one organic EL element L1. The organic EL element L1 is a display element that emits light at luminance determined based on the amount of current supplied thereto. The drive transistor T1 and the write control transistor T2 are N-channel type thin-film transistors (TFTs). As the drive transistor T1 and the write control transistor T2, oxide TFTs (thin-film transistors using an oxide semiconductor as a channel layer), amorphous silicon TFTs, etc., can be adopted. The oxide TFTs include, for example, a TFT containing indium gallium zinc oxide (InGaZnO). By adopting oxide TFTs, it becomes possible to achieve, for example, an increase in resolution and a reduction in power consumption.

A control terminal of the drive transistor T1, a second conductive terminal of the write control transistor T2, and one terminal of the capacitance C1 are connected to each other. Note that a region (wiring line) where they are connected to each other is referred to as "control node". The control node is given reference character Na. The drive transistor T1 is connected at its control terminal to the control node Na, connected at its first conductive terminal to a high-level power supply line 22, and connected at its second conductive terminal to an anode terminal of the organic EL element L1. The write control transistor T2 is connected at its control terminal to a scanning line Gi, connected at its first conductive terminal to a data line Dj, and connected at its second conductive terminal to the control node Na. The capacitance C1 is connected at its one terminal to the control node Na and connected at its other terminal to the first conductive terminal of the drive transistor T1. The organic EL element L1 is connected at its anode terminal to the second conductive terminal of the drive transistor T1 and connected at its cathode terminal to a low-level power supply line 23.

When a voltage on the scanning line Gi goes to high level, the write control transistor T2 goes into on state, by which a voltage on the data line Dj is applied to the control node Na. When the voltage on the scanning line Gi goes to low level, the write control transistor T2 goes into off state. When the write control transistor T2 goes into off state, the control node Na goes into floating state, by which a voltage between the control terminal and first conductive terminal of the drive transistor T1 is held in the capacitance C1. A drive current supplied to the organic EL element L1 changes depending on the voltage between the control terminal and first conductive terminal of the drive transistor T1. The organic EL element L1 emits light at luminance determined based on the magnitude of the drive current. By the organic EL element L1 in each pixel circuit 21 emitting light in this manner, an image is displayed on the display unit 20.

Note that the configuration of the pixel circuit 21 shown in FIG. 4 is an example and pixel circuits of various configurations can be adopted. For example, a pixel circuit configured to be able to compensate for degradation of the drive transistor T1 and the organic EL element L1 may be adopted.

<1.3 Configuration of the Touch Panel>

Next, a configuration of the touch panel 4 will be described. In the present embodiment, a sensor value for identifying a touch position is obtained for each node. FIG. 5 is a diagram schematically showing nodes included in the touch panel 4. In an example shown in FIG. 5, the touch panel 4 includes 15 nodes N1 to N15. Thus, in the example shown in FIG. 5, a touch position is identified by 15 sensor values. Note that in FIGS. 11, 17, and 25, a value corresponding to each node is shown in a box representing the node. Examples of a structure of sensor electrodes included in the touch panel 4 will be described below. Note, however, that the structures are not limited to those in the examples shown below.

Figure 6:
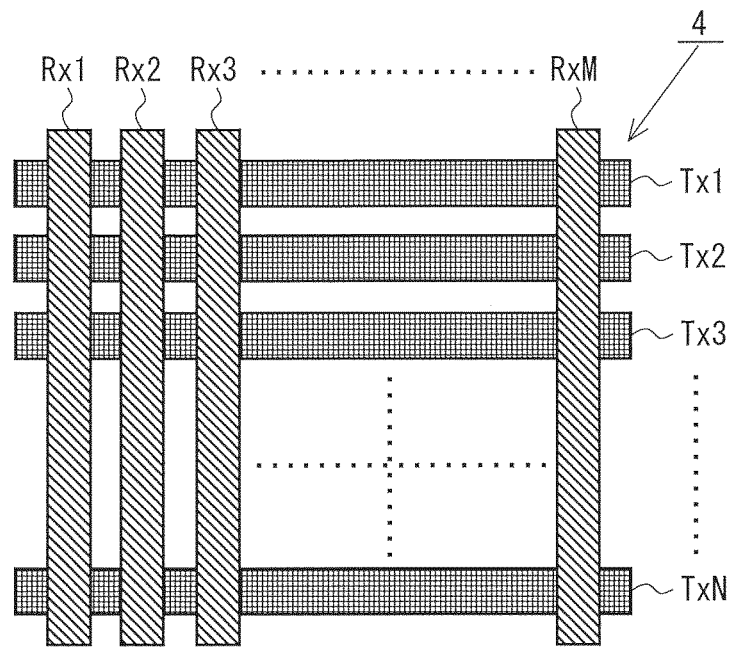
FIG. 6 is an example of a plan view of a touch panel of the first embodiment.

FIG. 6 is an example of a plan view of a touch panel 4. The touch panel 4 shown in FIG. 6 includes, as sensor electrodes, N drive lines (transmitting electrodes) Tx1 to TxN and M sensing lines (receiving electrodes) Rx1 to RxM. The drive lines Tx1 to TxN are arranged in parallel to each other. The sensing lines Rx1 to RxM are arranged in parallel to each other. The drive lines Tx1 to TxN are orthogonal to the sensing lines Rx1 to RxM. In this example, for example, one node is implemented by one intersecting point of one of the drive lines Tx1 to TxN and one of the sensing lines Rx1 to RxM.

Figure 7:
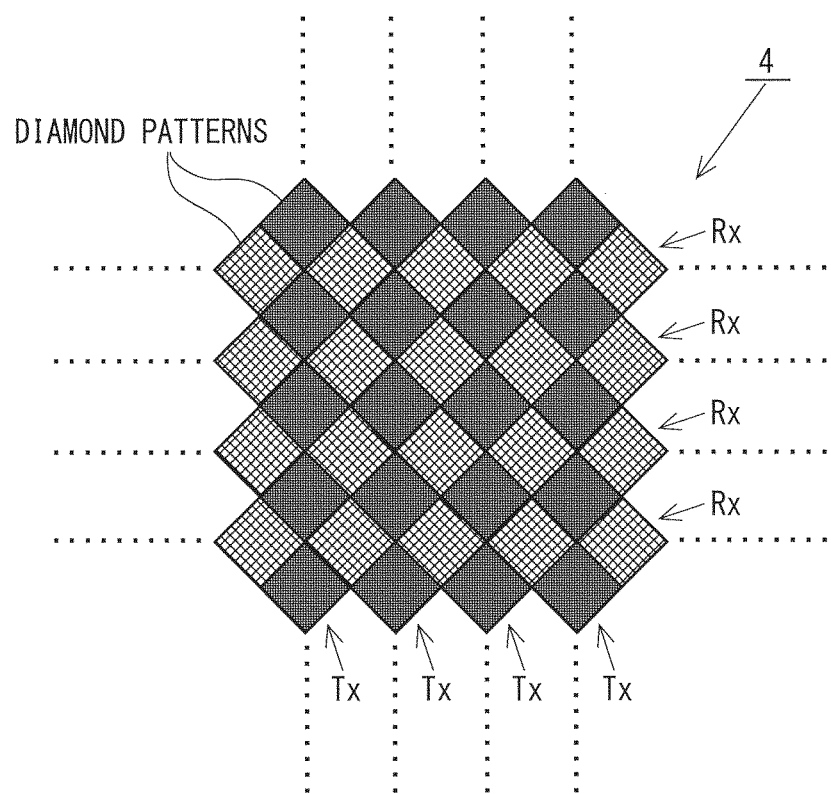
FIG. 7 is another example of a plan view of a touch panel (an example of a configuration called a diamond pattern) of the first embodiment.

FIG. 7 is another example of a plan view of a touch panel 4 (an example of a configuration called a diamond pattern). The touch panel 4 shown in FIG. 7 includes, as sensor electrodes, a plurality of transmitting electrodes Tx, each of which is a plurality of elements of a diamond pattern connected to each other in a longitudinal direction, and a plurality of receiving electrodes Rx, each of which is a plurality of elements of a diamond pattern connected to each other in a lateral direction. Regarding this configuration, it is possible to adopt a configuration in which the transmitting electrodes Tx and the receiving electrodes Rx are formed in different layers, a configuration in which the transmitting electrodes Tx and the receiving electrodes Rx are formed in the same layer, a configuration called a metal mesh type (a configuration in which silver or copper is used instead of using an ITO film as in a known case), etc. In this example, for example, one node is implemented by one intersecting point of a transmitting electrode Tx and a receiving electrode Rx.

<1.4 Configuration of the Touch Panel Controller>

Figure 8:
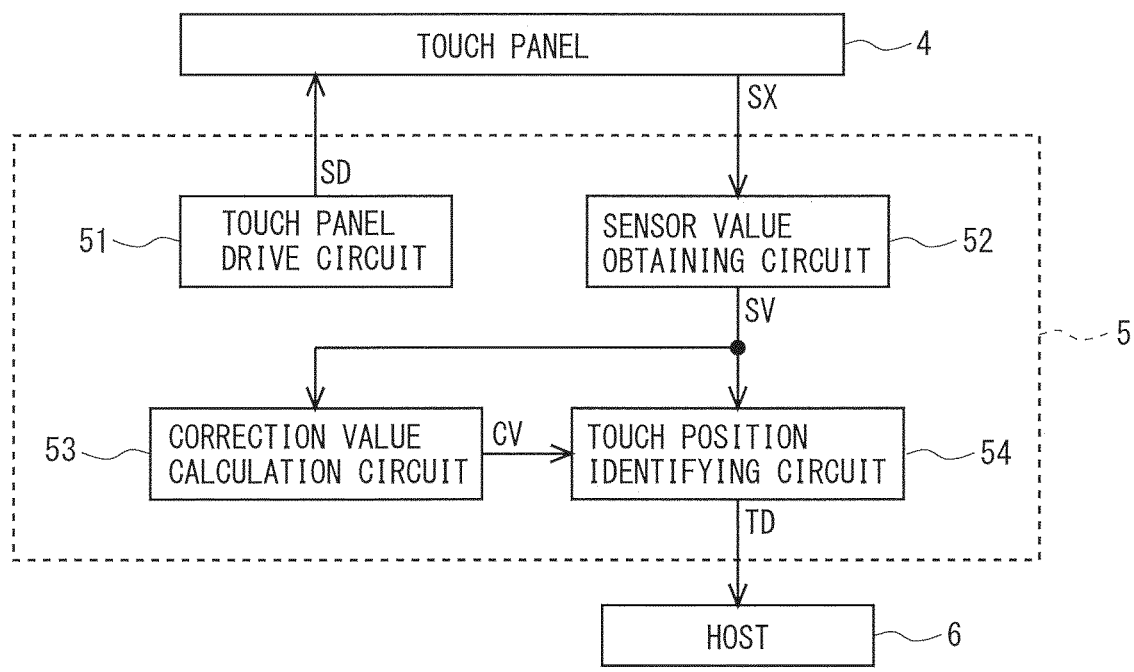
FIG. 8 is a block diagram showing a configuration of a touch panel controller in the first embodiment.

Next, with reference to FIG. 8, a configuration of the touch panel controller 5 will be described. The touch panel controller 5 includes a touch panel drive circuit 51, a sensor value obtaining circuit 52, a correction value calculation circuit 53, and a touch position identifying circuit 54. The touch panel drive circuit 51 provides a drive signal SD for performing touch detection to the touch panel 4. The sensor value obtaining circuit 52 obtains a sensor value SV for each node, based on a detection signal SX provided from the touch panel 4. Note that the detection signal SX provided from the touch panel 4 is an analog voltage, and thus, the sensor value obtaining circuit 52 includes an A/D converter. The sensor values SV obtained by the sensor value obtaining circuit 52 are transmitted to the correction value calculation circuit 53 and the touch position identifying circuit 54. Note that sensor values SV are constantly transmitted from the sensor value obtaining circuit 52 to the touch position identifying circuit 54, and sensor values SV obtained in no-touch state are transmitted from the sensor value obtaining circuit 52 to the correction value calculation circuit 53 at certain time intervals. The correction value calculation circuit 53 receives the sensor values SV obtained in no-touch state, and calculates correction values CV for correcting the sensor values SV so that influence by temperature is removed upon identifying a touch position. Note that a detailed description of the correction value calculation circuit 53 will be made later. The touch position identifying circuit 54 identifies a touch position based on the sensor values SV provided from the sensor value obtaining circuit 52 and the correction values CV provided from the correction value calculation circuit 53. More specifically, the touch position identifying circuit 54 corrects sensor values SV obtained most recently by the sensor value obtaining circuit 52, using correction values CV provided from the correction value calculation circuit 53, and identifies a touch position based on values obtained by the correction. Then, the touch position identifying circuit 54 transmits touch position information TD to the host 6.

<1.5 Procedure for Identifying a Touch Position>

Figure 9:
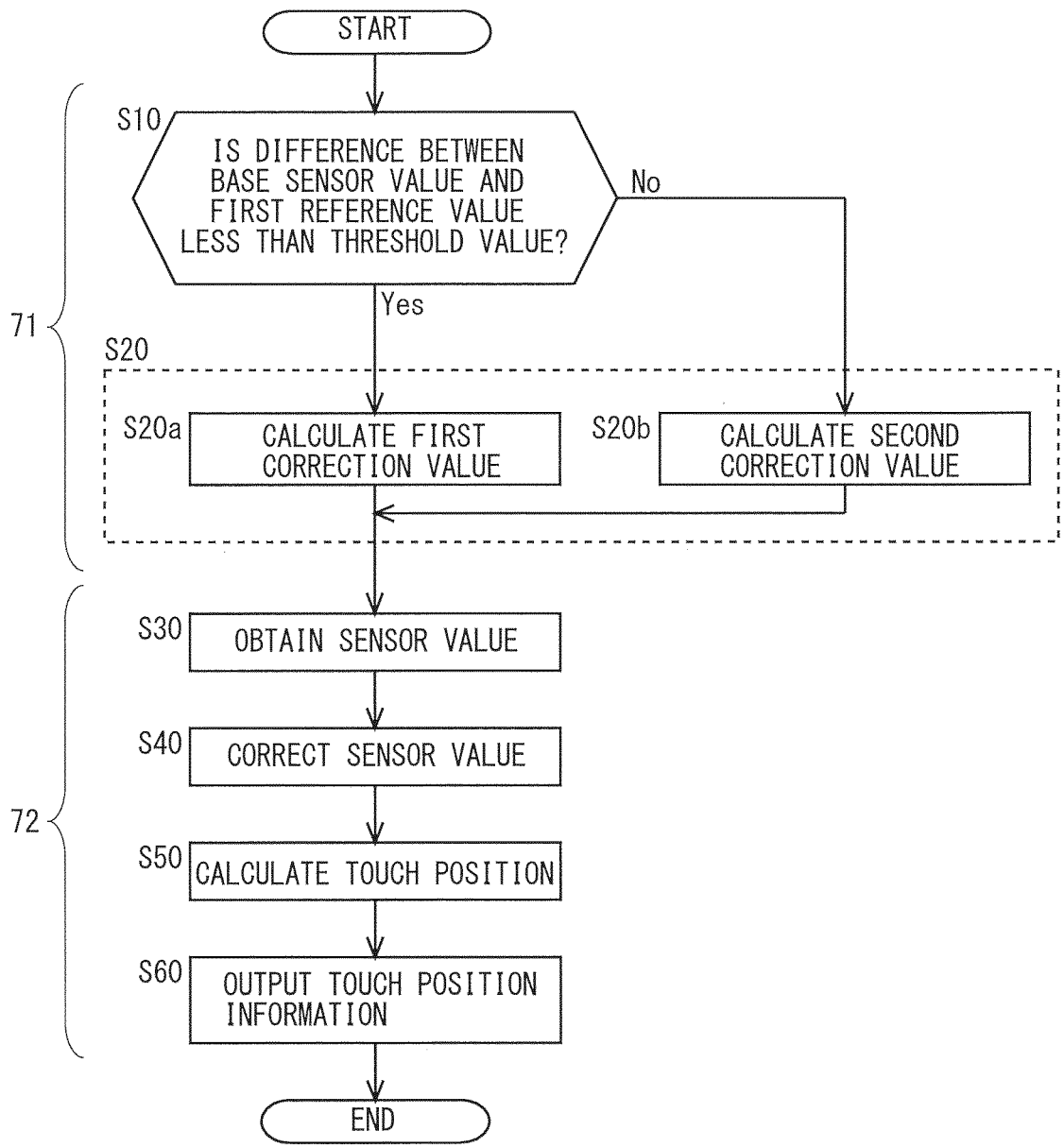
FIG. 9 is a flowchart showing a procedure for identifying a touch position in the first embodiment.

FIG. 9 is a flowchart showing a procedure for identifying a touch position. Note that it is assumed that a sensor value obtained when the organic EL element L1 does not emit light in normal temperature state (hereinafter, referred to as "first reference value".) and a sensor value obtained when the organic EL element L1 emits light in normal temperature state (hereinafter, referred to as "second reference value".) are obtained in advance (before the organic EL display device is shipped from the factory) by the sensor value obtaining circuit 52, and the first reference values and the second reference values are held in the correction value calculation circuit 53. In addition, it is assumed that sensor values (sensor values obtained in no-touch state) SV obtained at certain time intervals by the sensor value obtaining circuit 52 are held as base sensor values in the correction value calculation circuit 53. In addition, an ideal value to be obtained by correcting the base sensor value is referred to as "reference value". Note that the reference value is identical for all nodes.

First, it is determined whether a difference between a base sensor value and a first reference value is less than a predetermined threshold value (step S10). After the determination, processing proceeds to step S20. Specifically, if the difference between the base sensor value and the first reference value is less than the threshold value, then processing proceeds to step S20a, and if the difference between the base sensor value and the first reference value is greater than or equal to the threshold value, then processing proceeds to step S20b. At step S20a, a first correction value is calculated based on the base sensor value and a reference value. At step S20b, a second correction value is calculated based on the base sensor value, the first reference value, a second reference value, and a reference value. The first correction value and the second correction value are stored in a correction value storage unit which will be described later. As described above, at step S20, calculation of a correction value CV (the first correction value or the second correction value) and storing of the calculated correction value CV in the correction value storage unit are performed. Note that processes at step S10 and S20 are performed for each node. Thus, for a node in which a difference between the base sensor value and the first reference value is less than the threshold value, calculation of the first correction value is performed, and for a node in which a difference between the base sensor value and the first reference value is greater than or equal to the threshold value, calculation of the second correction value is performed.

At step S30, the sensor value obtaining circuit 52 obtains sensor values SV. Thereafter, the sensor values SV obtained at step S30 (i.e., sensor values SV obtained most recently by the sensor value obtaining circuit 52) are corrected using the correction values CV stored in the correction value storage unit at step S20 (step S40). Then, a touch position is calculated based on the sensor values after correction at step S40 (step S50), and touch position information TD is outputted based on a result of the calculation (step S60).

Note that in practice, processes included in a portion given reference character 71 in FIG. 9 are performed independently of processes included in a portion given reference character 72 in FIG. 9. Specifically, the processes included in the portion given reference character 71 are performed at certain time intervals by the correction value calculation circuit 53, and the processes included in the portion given reference character 72 are constantly performed by the sensor value obtaining circuit 52 and the touch position identifying circuit 54.

In the present embodiment, a determining step is implemented by step S10, a correction value calculating step is implemented by step S20a and step S20b, a sensor value correcting step is implemented by step S40, and a position calculating step is implemented by step S50.

<1.6 Calculation of Correction Values>

Figure 1:
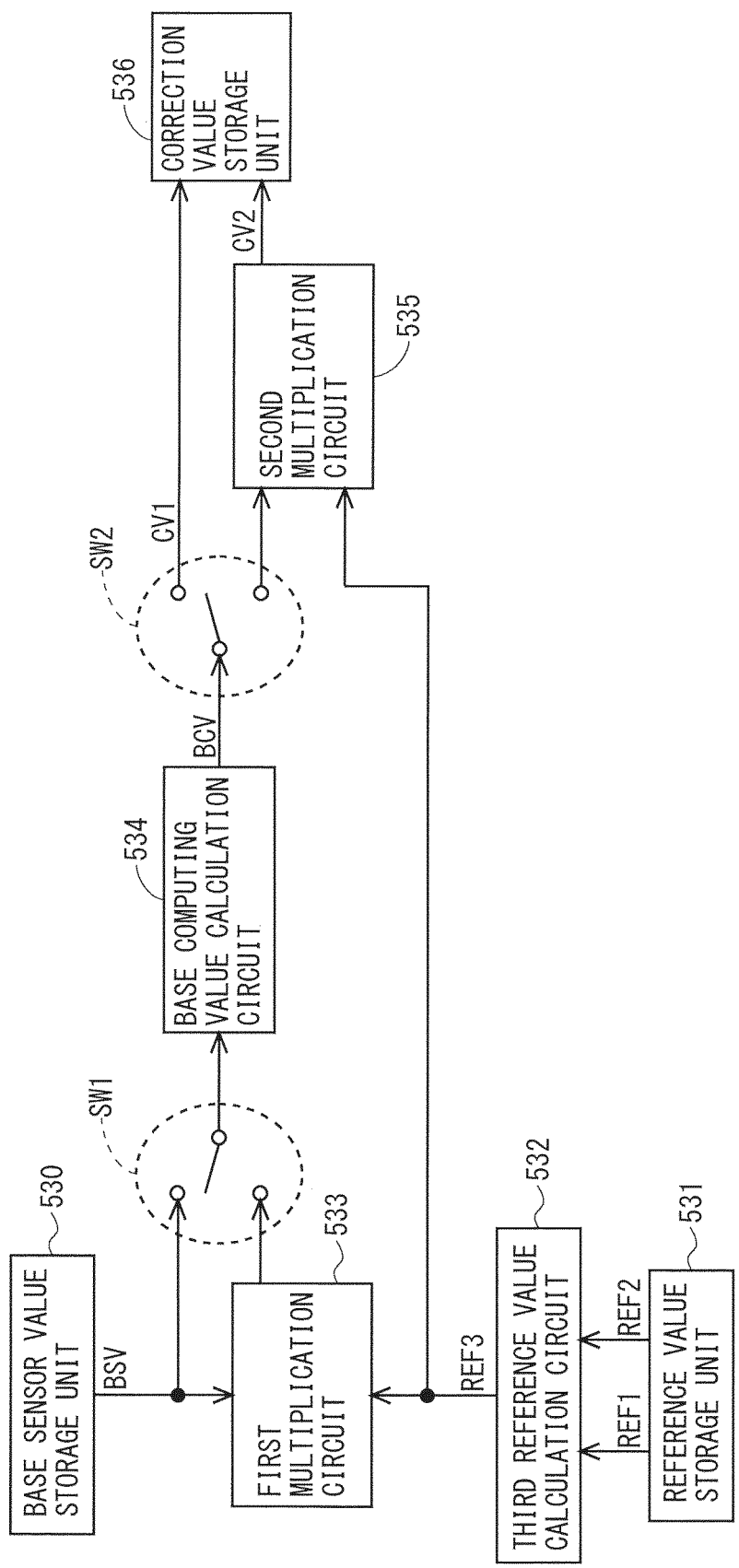
FIG. 1 is a block diagram showing a configuration of a correction value calculation circuit in a first embodiment.

Next, calculation of correction values by the correction value calculation circuit 53 in the touch panel controller 5 will be described in detail. FIG. 1 is a block diagram showing a configuration of the correction value calculation circuit 53. As shown in FIG. 1, the correction value calculation circuit 53 includes a base sensor value storage unit 530, a reference value storage unit 531, a third reference value calculation circuit 532, a first multiplication circuit 533, a base computing value calculation circuit 534, a second multiplication circuit 535, and a correction value storage unit 536. In addition, the correction value calculation circuit 53 includes first switching means SW1 for controlling input data provided to the base computing value calculation circuit 534; and second switching means SW2 for controlling output data provided from the base computing value calculation circuit 534.

The base sensor value storage unit 530 stores base sensor values (sensor values obtained at certain time intervals by the sensor value obtaining circuit 52) BSV. The reference value storage unit 531 stores the above-described first reference values REF1 and second reference values REF2. The third reference value calculation circuit 532 calculates third reference values REF3 each representing a ratio of the first reference value REF1 to the second reference value REF2. The first multiplication circuit 533 determines the product of the third reference value REF3 and the base sensor value BSV. Note that typically, the base sensor value storage unit 530 is implemented by a random access memory (RAM), and the reference value storage unit 531 is implemented by a read only memory (ROM).

The base computing value calculation circuit 534 determines a base computing value BCV representing a ratio of the above-described reference value to an input value. Here, regarding the base computing value BCV, an upper limit value and a lower limit value are set due to the constraints of an IC that implements the base computing value calculation circuit 534. That is, the base computing value BCV is a value in a predetermined range. To the base computing value calculation circuit 534 is provided, as an input value, the "base sensor value BSV" or the "product of the third reference value REF3 and the base sensor value BSV", based on control by the first switching means SW1. The base computing value BCV determined by the base computing value calculation circuit 534 is provided as a first correction value CV1 to the correction value storage unit 536, or provided to the second multiplication circuit 535, based on control by the second switching means SW2. The second multiplication circuit 535 determines the product of the base computing value BCV and the third reference value REF3. The product determined by the second multiplication circuit 535 is provided as a second correction value CV2 to the correction value storage unit 536.

The correction value storage unit 536 stores one correction value per node. Regarding this, for a node in which a difference between the base sensor value BSV and the first reference value REF1 is less than a threshold value, the first correction value CV1 is stored in the correction value storage unit 536, and for a node in which a difference between the base sensor value BSV and the first reference value REF1 is greater than or equal to the threshold value, the second correction value CV2 is stored in the correction value storage unit 536. Note that typically, the correction value storage unit 536 is implemented by a random access memory (RAM).

Figures 10, 11:
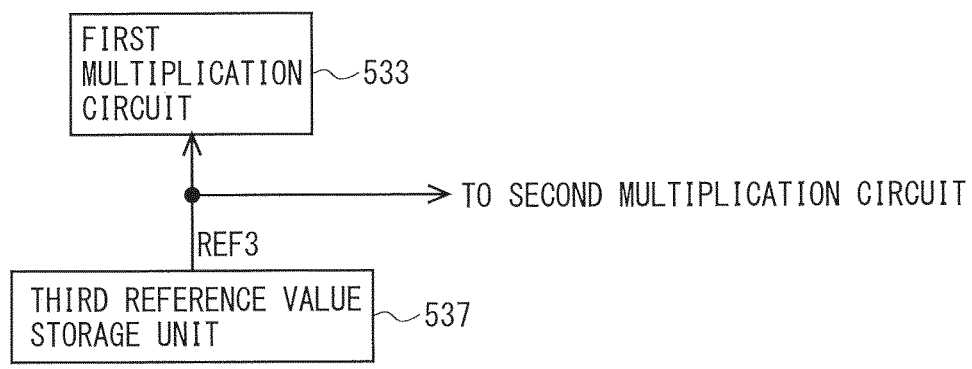
FIG. 10 is a diagram for describing another exemplary configuration of a correction value calculation circuit in the first embodiment.
FIG. 11 is a diagram for describing first correction values in the first embodiment.

Note that according to the configuration shown in FIG. 1, the third reference value REF3 is calculated in the correction value calculation circuit 53, based on the first reference value REF1 and the second reference value REF2. However, the configuration is not limited thereto, and it is also possible to adopt a configuration in which, as shown in FIG. 10, the correction value calculation circuit 53 is provided with a third reference value storage unit 537 that stores the third reference values REF3 each being calculated in advance based on the first reference value REF1 and the second reference value REF2. In this case, typically, the third reference value storage unit 537 is implemented by a read only memory (ROM).

Figure 12:
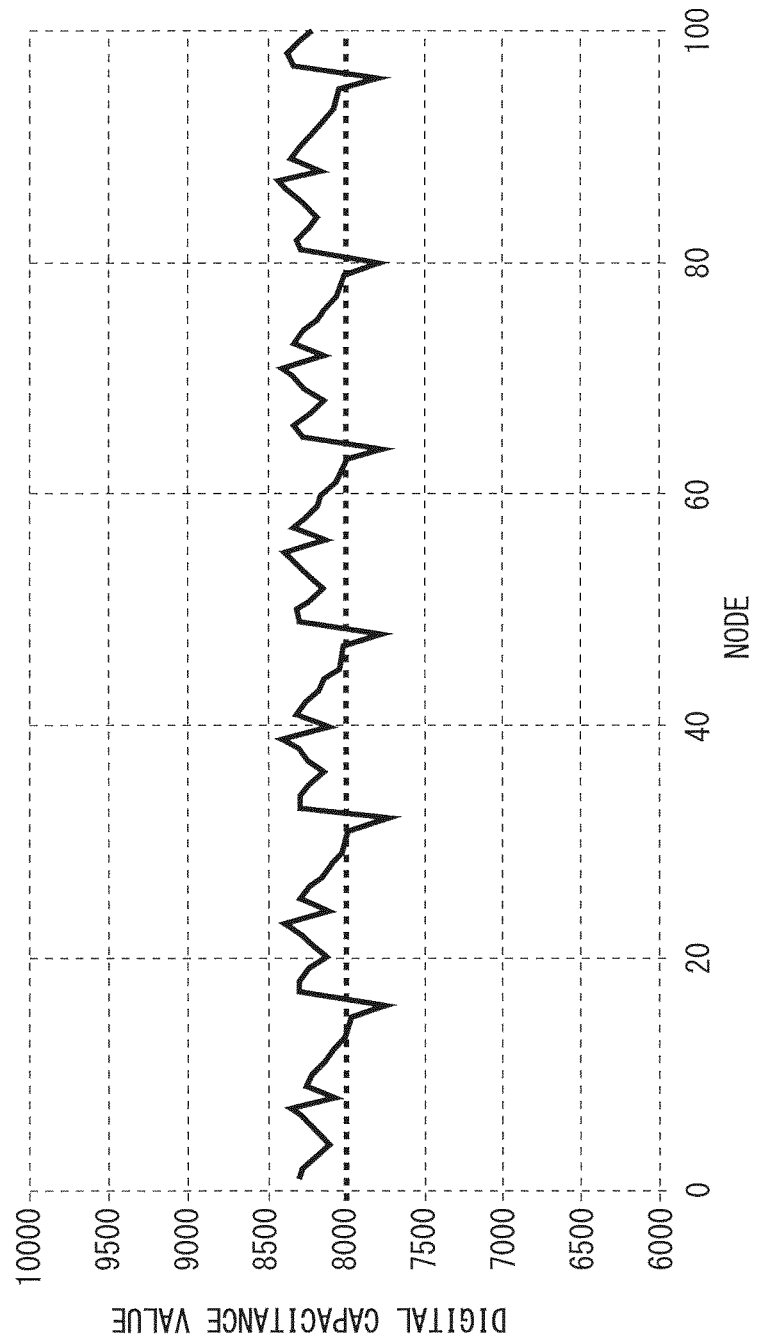
FIG. 12 is a diagram for describing correction of a base sensor value using a first correction value in the first embodiment.
Figure 13:
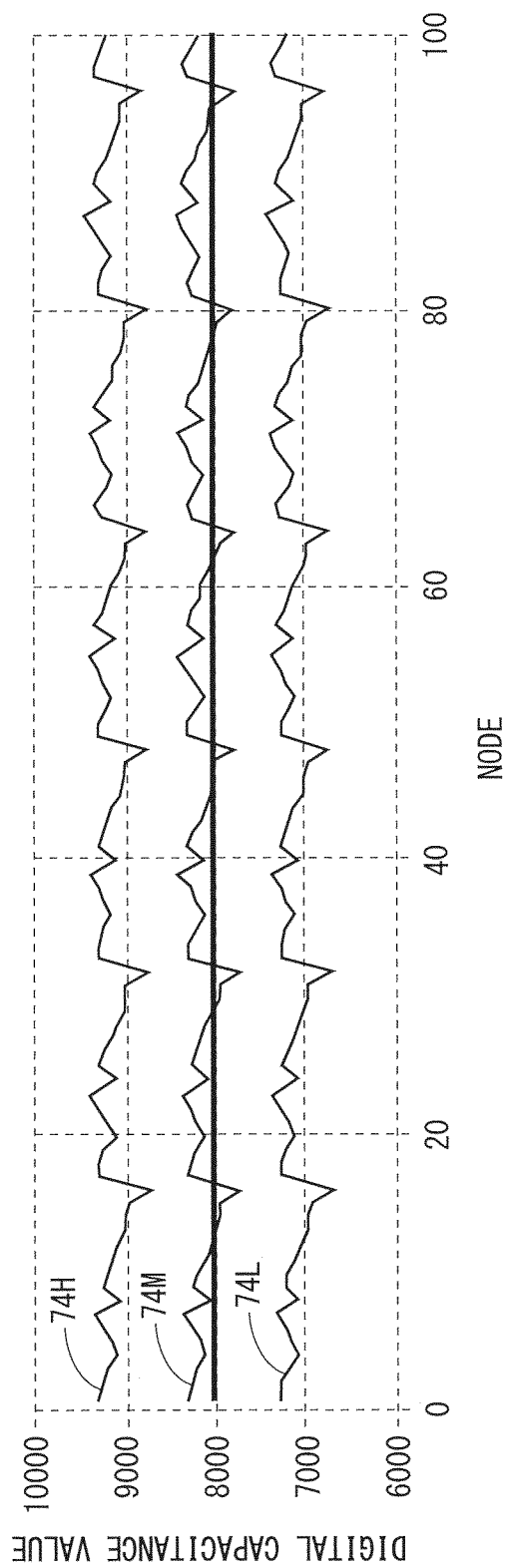
FIG. 13 is a diagram showing an example of digital capacitance values for respective nodes in high-temperature state, normal temperature state, and low-temperature state in the first embodiment.
Figure 14:
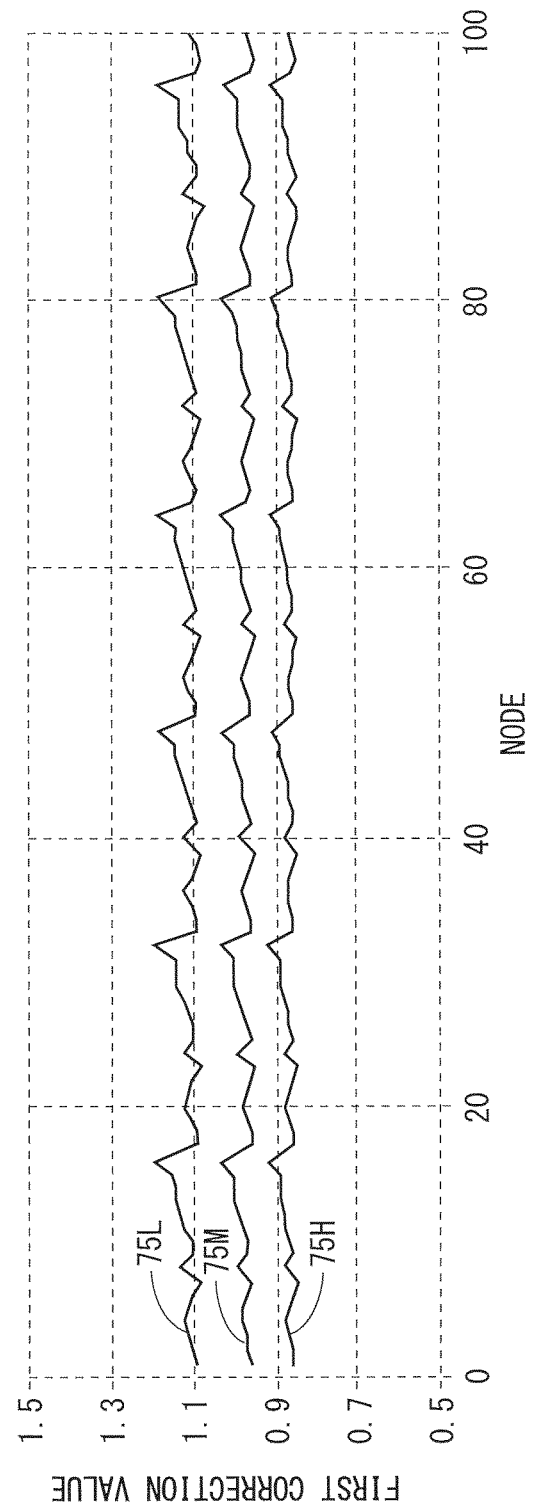
FIG. 14 is a diagram showing an example of first correction values for respective nodes in high-temperature state, normal temperature state, and low-temperature state in the first embodiment.

In the present embodiment, the first correction values CV1 and the second correction values CV2 are determined by the correction value calculation circuit 53 having a configuration such as that described above. Now, with reference to FIG. 11, the first correction value CV1 will be described. Note that base sensor values BSV and reference values in FIG. 11 are not actual sensor values, but are values obtained when the reference value is converted to 1. As can be grasped from FIG. 11, the product of the base sensor value BSV and the first correction value CV1 is the reference value. That is, the first correction value CV1 is obtained by dividing the reference value by the base sensor value BSV. In other words, a factor required to make a value obtained by correcting a base sensor value BSV to be a value (reference value) that is identical for all nodes is the first correction value CV1. FIG. 12 is a diagram for describing correction of the base sensor value BSV using the first correction value CV1. In FIG. 12, the base sensor value BSV is represented by a bold solid line, and the reference value is represented by a bold dotted line. When the base sensor value BSV is multiplied by the first correction value CV1 for respective nodes, a resulting value is equal to the reference value in all nodes. Note that the base sensor value BSV increases as temperature increases, and decreases as temperature decreases. For example, in FIG. 13, solid lines given reference characters 74H, 74M, and 74L respectively represent base sensor values BSV (digital capacitance values) for respective nodes in high-temperature state, normal temperature state, and low-temperature state. The first correction value CV1 decreases as the base sensor value BSV increases, and increases as the base sensor value BSV decreases. Thus, in a case of an example shown in FIG. 13, first correction values CV1 for respective nodes in high-temperature state, normal temperature state, and low-temperature state are values represented by solid lines given reference characters 75H, 75M, and 75L, respectively, in FIG. 14. For all of the high-temperature state, normal temperature state, and low-temperature state, when the product of the base sensor value BSV (digital capacitance value) and the first correction value CV1 is determined for respective nodes, a resulting value is equal to the reference value (a value represented by a bold solid line in FIG. 13) for all nodes.

From the above, by correcting, for each node, the sensor value SV using the first correction value CV1 upon identifying a touch position, even if temperature increase in a panel plane is non-uniform, sensor values SV for all nodes can be converted to values obtained in normal state. By this, a touch position can be identified, with influence by temperature being removed.

Meanwhile, in an organic EL display device having a support film provided on the entire back side of a panel thereof, by preparing only the above-described first correction values CV1 as correction values, influence by temperature can be removed upon identifying a touch position. However, in an organic EL display device provided with no support film or an organic EL display device provided with a support film only on a part of the back side of a panel thereof, in a case in which only first correction values CV1 are prepared as correction values, there is a possibility that influence by temperature may not be able to be removed upon identifying a touch position. There are the following three reasons for this.

1: A settable range (an upper limit value and a lower limit value) for digital capacitance values is defined in the IC including the base computing value calculation circuit 534 (see FIG. 1), and a value obtained by dividing a reference value by a base sensor value BSV can be a value out of the settable range.

2: In a related art, local temperature changes are not assumed, and for some IC, a correction process cannot cope with local temperature changes.

3: In a related art, a correction process is performed taking into account only external environmental changes, and temperature changes (temperature increase inside the device) caused by user's usage or the configuration of a module are not taken into account with respect to the correction process.

Figure 15:
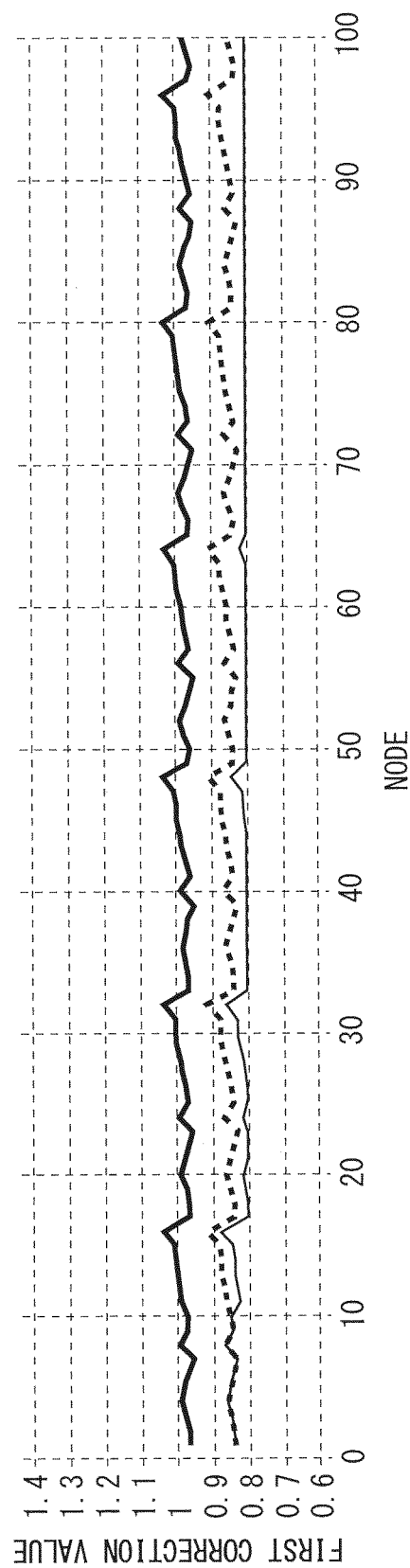
FIG. 15 is a diagram showing an example of first correction values for respective nodes for a case in which a lower limit value is set to 0.8 in the first embodiment.

FIG. 15 is a diagram showing an example of first correction values CV1 for respective nodes for a case in which the lower limit value is set to 0.8. In FIG. 15, a bold solid line represents an example of first correction values CV1 for respective nodes for a case in which the external temperature is normal temperature (the internal temperature is also normal temperature), a bold dotted line represents an example of first correction values CV1 for respective nodes for a case in which the external temperature is a high temperature (the internal temperature is normal temperature), and a solid line represents an example of first correction values CV1 for respective nodes for a case in which both the external temperature and the internal temperature are high temperatures. In a case in which both the external temperature and the internal temperature are high temperatures, first correction values CV1 for many nodes are 0.8 which is the lower limit value. If the lower limit value is not set, then it is conceivable that in a case in which both the external temperature and the internal temperature are high temperatures, the first correction value CV1 is smaller than 0.8 in many nodes.

Figure 16:
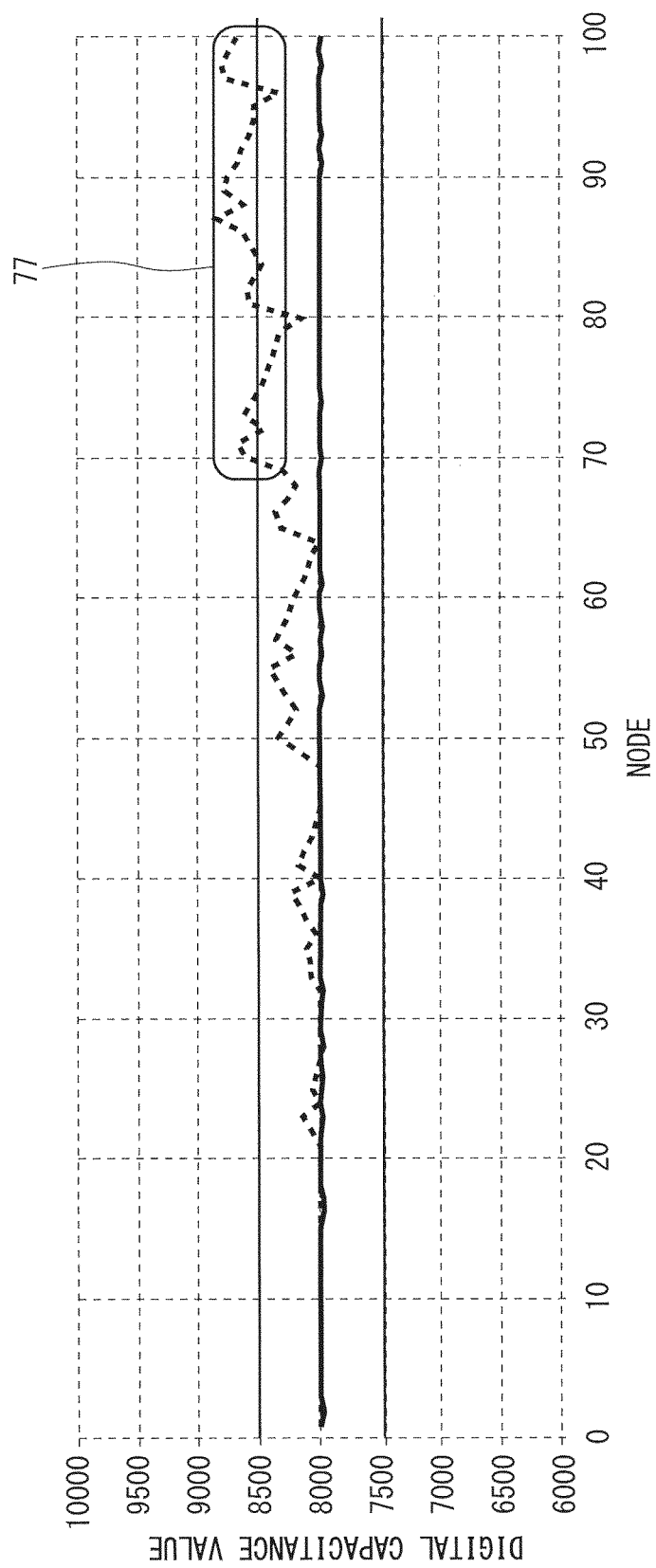
FIG. 16 is a diagram showing an example of digital capacitance values (sensor values) corrected based on first correction values in the first embodiment.

FIG. 16 is a diagram showing an example of digital capacitance values (sensor values) corrected based on first correction values CV1 shown in FIG. 15. Note that it is assumed that the lower limit value of digital capacitance values is 7500 and the upper limit value of digital capacitance values is 8500. In a case in which the external temperature is normal temperature (the internal temperature is also normal temperature) and in a case in which the external temperature is a high temperature (the internal temperature is normal temperature), corrected digital capacitance values for respective nodes are values represented by a bold solid line in FIG. 16. On the other hand, in a case in which both the external temperature and the internal temperature are high temperatures, corrected digital capacitance values for respective nodes are values represented by a bold dotted line in FIG. 16. When taking a look at a box portion given reference character 77, digital capacitance values for many nodes exceed the upper limit value. If the corrected digital capacitance values thus exceed the upper limit value, then a correction process performed upon touch detection is not performed normally. Hence, in the present embodiment, as described above, the first correction value CV1 and the second correction value CV2 are prepared as correction values.

In the present embodiment, a configuration is adopted in which when a digital capacitance value corrected based on a first correction value CV1 is out of the range from the lower limit value to the upper limit value, a correction based on a second correction value CV2 is made. Specifically, if a difference between a base sensor value BSV and a first reference value REF1 is greater than or equal to a predetermined threshold value, then it is determined that a digital capacitance value corrected based on a first correction value CV1 is out of the range from the lower limit value to the upper limit value, and a correction based on a second correction value CV2 is made (see step S10 and S20 in FIG. 9).

With reference to FIG. 17, the second correction value CV2 will be described. Note that the base sensor value and the reference value in FIG. 17 are digital capacitance values. As can be grasped from FIG. 17, the product of the base sensor value BSV, the third reference value REF3, and the base computing value BCV is the reference value. The product of the third reference value REF3 and the base computing value BCV is the second correction value CV2.

Upon calculating the second correction value CV2, first, the third reference value calculation circuit 532 determines the third reference value REF3 by dividing the first reference value REF1 by the second reference value REF2. Then, the first multiplication circuit 533 determines the product of the base sensor value BSV and the third reference value REF3. The product of the base sensor value BSV and the third reference value REF3 is provided as an input value to the base computing value calculation circuit 534. By this, the base computing value calculation circuit 534 determines the base computing value BCV by dividing the reference value by the product of the base sensor value BSV and the third reference value REF3. The product of the base computing value BCV and the third reference value REF3 is determined as the second correction value CV2 by the second multiplication circuit 535. For a node in which a difference between the base sensor value BSV and the first reference value REF1 is greater than or equal to a predetermined threshold value, the second correction value CV2 is calculated in the above-described manner.

Figure 18:
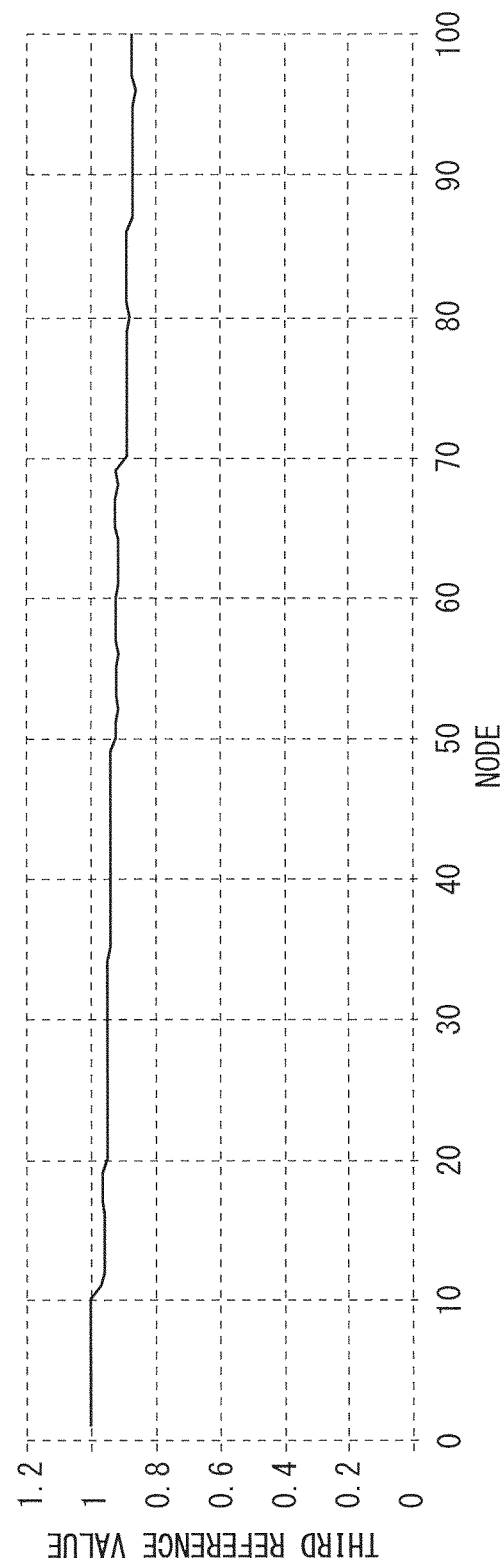
FIG. 18 is a diagram showing an example of third reference values for respective nodes in the first embodiment.

FIG. 18 is a diagram showing an example of third reference values REF3 for respective nodes. As shown in FIG. 18, the third reference values REF3 are less than or equal to 1. This is because the third reference value REF3 is a value calculated by dividing the first reference value REF1 by the second reference value REF2, and the second reference value REF2 which is a sensor value obtained when the organic EL element L1 emits light is larger than the first reference value REF1 which is a sensor value obtained when the organic EL element L1 does not emit light.

Figure 19:
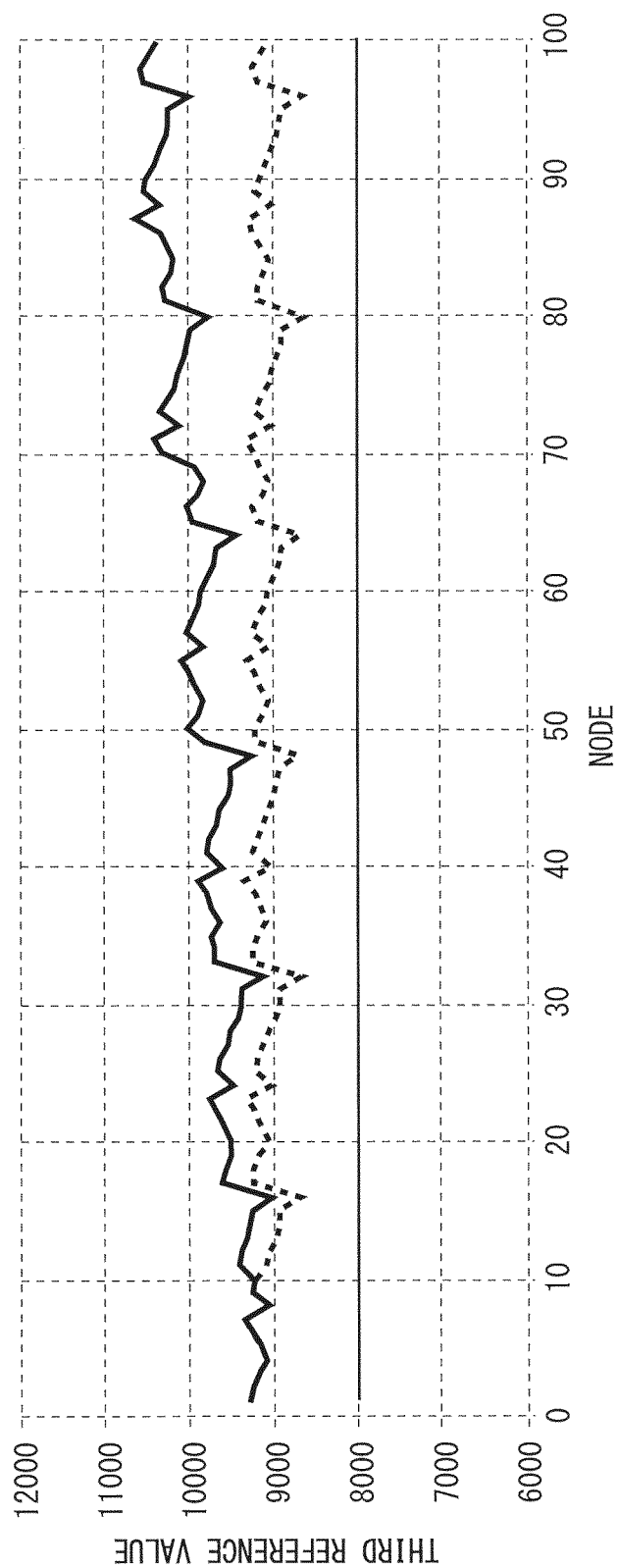
FIG. 19 is a diagram for describing a correction made based on a second correction value in the first embodiment.

FIG. 19 is a diagram for describing a correction made based on the second correction value CV2. In a case in which base sensor value BSVs for respective nodes are values represented by a bold solid line in FIG. 19, the products of the base sensor value BSV and the third reference value REF3 (see FIG. 18) for respective nodes are values represented by a bold dotted line in FIG. 19. When the product of the base sensor value BSV and the third reference value REF3 is further multiplied by the base computing value BCV for respective nodes, a resulting value is equal to the reference value (a value represented by the solid line in FIG. 19) in all nodes. Upon identifying a touch position by the touch position identifying circuit 54, the sensor value SV is corrected based on the second correction value CV2 which is the product of the third reference value REF3 and the base computing value BCV. As with the first correction value CV1, the second correction value CV2 corresponds to a ratio of the reference value to the base sensor value BSV, and thus, even when a correction process is performed using the second correction value CV2 upon identifying a touch position, the sensor value SV is corrected so that influence by temperature is removed.

<1.7 Effects>

Figure 20:
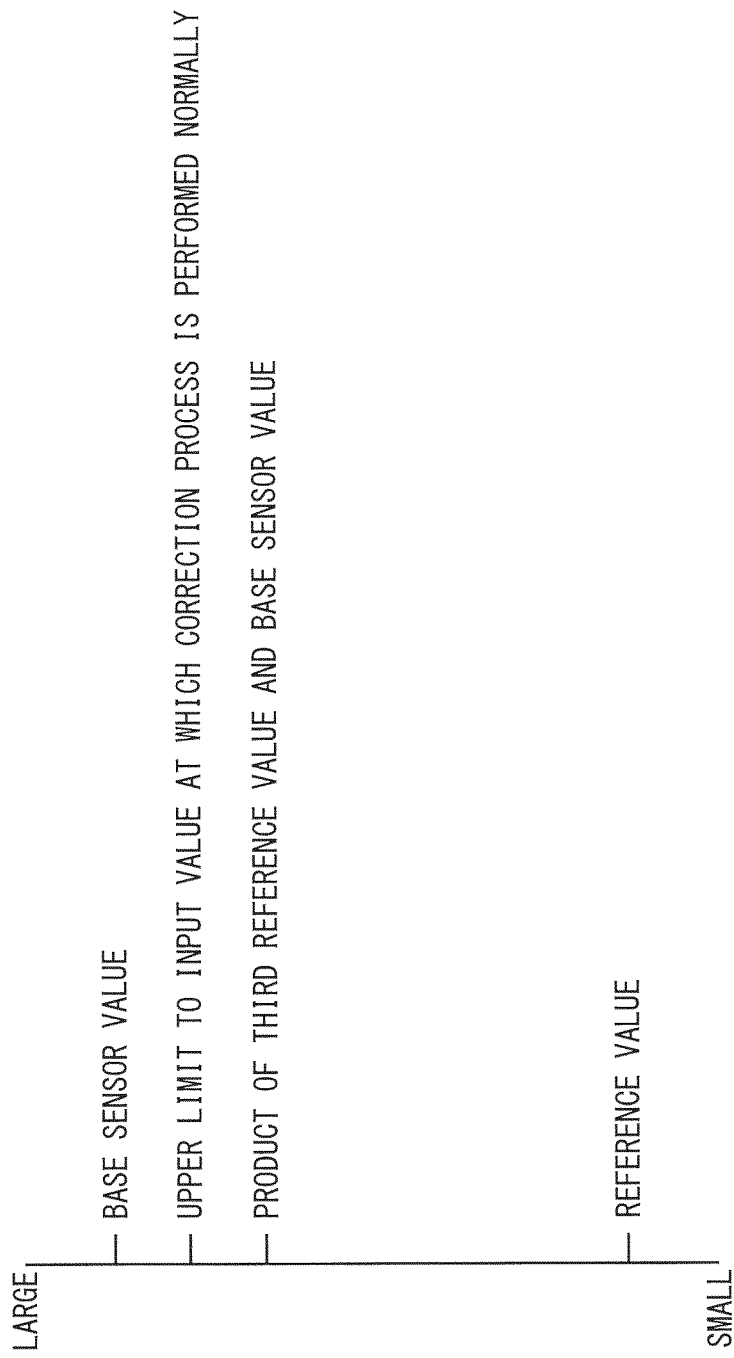
FIG. 20 is a diagram for describing an effect provided in the first embodiment.

According to the present embodiment, as correction values for touch detection, the first correction value CV1 and the second correction value CV2 are prepared. That is, two types of correction values are prepared. The base computing value calculation circuit 534 that calculates the base computing value BCV representing a ratio of the reference value to an input value is provided as a component for determining a correction value, and an upper limit value and a lower limit value are set for the base computing value BCV. In other words, there is a limit to an input value that can be provided to the base computing value calculation circuit 534. Normally, a correction value for touch detection can be determined by providing, as an input value, the base sensor value BSV which is a sensor value obtained at certain time intervals to the base computing value calculation circuit 534. However, in a case in which the base sensor value BSV exceeds, as shown in FIG. 20, an upper limit of an input value at which a correction process is performed normally, if the base sensor value BSV is provided as an input value to the base computing value calculation circuit 534, then an overflow occurs. Therefore, even if an obtained correction value is used, a normal correction process is not performed. In this regard, according to the present embodiment, for a node in which a difference between the base sensor value BSV and the first reference value REF1 which is a sensor value obtained before shipment of the device and obtained when the organic EL element L1 does not emit light in normal temperature state is greater than a predetermined threshold value, first, the product of the third reference value REF3 representing a ratio of the first reference value REF1 to the second reference value REF2 which is a sensor value obtained before shipment of the device and obtained when the organic EL element L1 emits light in normal temperature state, and the base sensor value BSV is determined. Then, by providing the product as an input value to the base computing value calculation circuit 534, the base computing value BCV is determined, and by multiplying the base computing value BCV by the third reference value REF3, the second correction value CV2 is determined. Here, as shown in FIG. 20, the product of the third reference value REF3 and the base sensor value BSV is less than or equal to the upper limit of an input value (an input value provided to the base computing value calculation circuit 534) at which a correction process is performed normally. Thus, even when the product of the third reference value REFS and the base sensor value BSV is provided as an input value to the base computing value calculation circuit 534, an overflow does not occur. Thus, a correction process for touch detection can be performed normally using the second correction value CV2. From the above, regardless of the temperature of each node, for all nodes, a suitable correction value is determined so that a correction process for touch detection is performed normally. Therefore, a touch position is accurately identified. As above, according to the present embodiment, an organic EL display device is implemented that can accurately identify a touch position even if temperature increase in a panel plane is non-uniform.

<1.8 Variant>

In the above-described first embodiment, for all nodes, a determination as to whether a difference between the base sensor value BSV and the first reference value REF1 is less than a predetermined threshold value is made in order to determine which one of the first correction value CV1 and the second correction value CV2 is used to perform a correction process. However, it is not limited thereto, and the above-described determination does not necessarily need to be made for all nodes, which will be described below.

Figure 21:
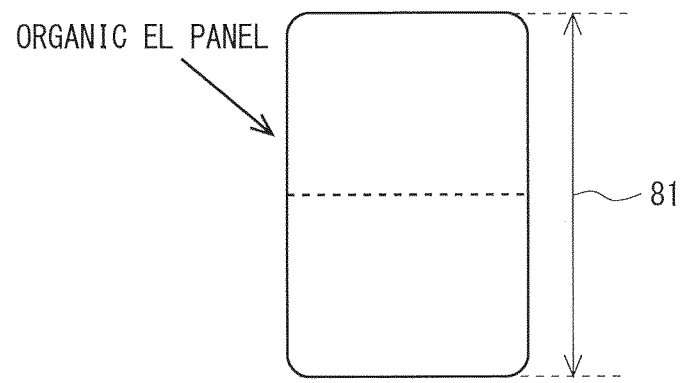
FIG. 21 is a diagram for describing a light-emitting area at a time when the entire panel is used in a variant of the first embodiment.
Figure 22:
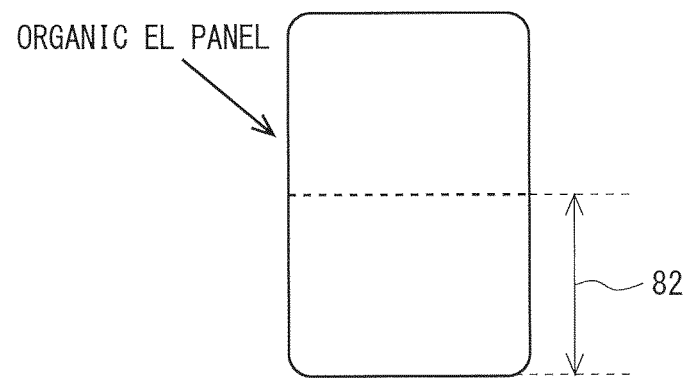
FIG. 22 is a diagram for describing a light-emitting area at a time when a half panel is used in the variant of the first embodiment.
Figure 23:
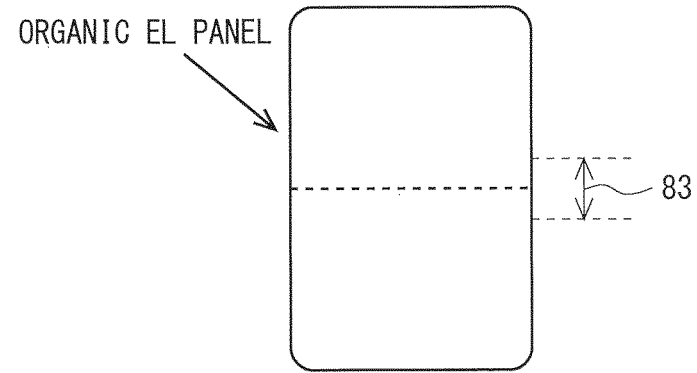
FIG. 23 is a diagram for describing a light-emitting area at a time when only a bent portion of the panel is used in the variant of the first embodiment.

Regarding a bendable organic EL display device, possible usage states of a panel include a state in which the entire panel is used (hereinafter, referred to as "first state".), a state in which a half panel is used (hereinafter, referred to as "second state".), and a state in which only a bent portion of the panel is used (hereinafter, referred to as "third state".). In the first state, organic EL elements L1 in an area given reference character 81 in FIG. 21 emit light. In the second state, for example, organic EL elements L1 in an area given reference character 82 in FIG. 22 emit light. In the third state, for example, organic EL elements L1 in an area given reference character 83 in FIG. 23 emit light.

Meanwhile, the internal temperature of the organic EL panel 2 not only changes depending on a display pattern, but also changes depending on the usage state such as those described above. Normally, as for an unused portion of the entire panel, the internal temperature does not become high. Thus, it can be determined that for nodes corresponding to the unused portion, a correction process may be performed using first correction values CV1. In addition, a usage state of the organic EL panel 2 can be detected by the host 6. That is, the host 6 includes usage state detecting means for detecting a usage state of the organic EL panel 2. Thus, taking into account a user's usage state of the organic EL panel 2, the following control may be performed.

The host 6 provides information on a usage state of the organic EL panel 2 to the touch panel controller 5. Then, for only nodes corresponding to a portion in use in the entire organic EL panel 2, the correction value calculation circuit 53 in the touch panel controller 5 performs a determination process (step S10 of FIG. 9) of comparing a difference between the base sensor value BSV and the first reference value REF1 with a predetermined threshold value in order to determine which one of the first correction value CV1 and the second correction value CV2 is to be stored as a correction value in the correction value storage unit 536. For nodes corresponding to a portion not in use in the entire organic EL panel 2, without performing the above-described determination process, the first correction value CV1 (the base computing value BCV obtained by providing the base sensor value BSV as an input value to the base computing value calculation circuit 534) is stored in the correction value storage unit 536.

According to the present variant, regarding the unused portion, there is no need to perform the process of step S10 in FIG. 9. By this, regarding a correction process performed based on temperature, overall processing efficiency increases.

2. Second Embodiment

<2.1 Overview and Configuration>

As described above, when temperature increase in a panel plane is non-uniform, the ease of current flow is non-uniform, causing variations in luminance. Therefore, normally, an organic EL display device performs a luminance correction process to suppress occurrence of such variations in luminance. In general, data for a luminance correction process (hereinafter, referred to as "luminance variations correction data".) is written into an internal ROM, etc., upon shipment of an organic EL display device from the factory, and the luminance correction process is performed using the luminance variations correction data when the organic EL display device is actually used. However, the luminance variations correction data is not data that takes into account changes in external temperature and changes in internal temperature. Hence, a luminance adjustment based on changes in temperature is not made. In addition, to grasp a temperature distribution in the panel plane, many temperature sensors, etc., are required, which leads to an increase in the number of parts and cost increase.

Hence, in the present embodiment, instead of performing the luminance correction process based only on the luminance variations correction data, the luminance correction process is performed based on the luminance variations correction data and correction values for touch detection (correction values stored in the above-described correction value storage unit 536) CV, so that a temperature distribution in the panel plane is taken into account.

Figure 24:
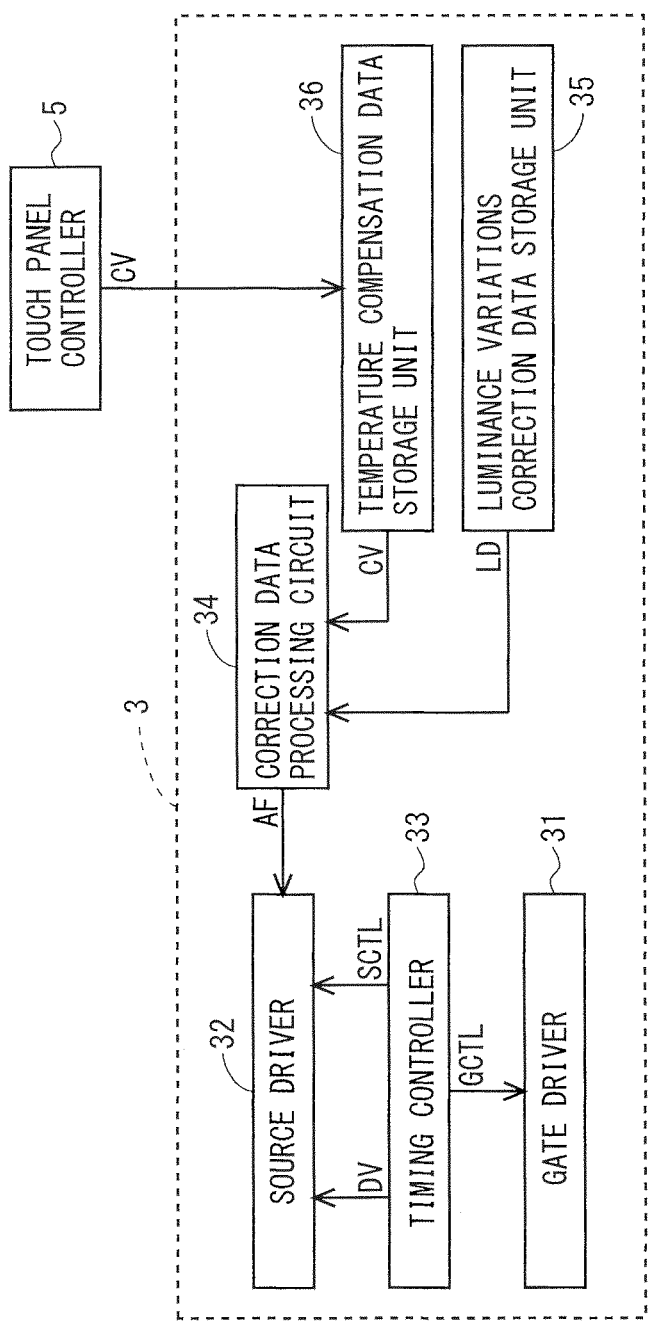
FIG. 24 is a block diagram showing a configuration of a display driver of a second embodiment.

The overall configuration is the same as that of the first embodiment, and processes for touch detection are also performed in the same manner as in the first embodiment. FIG. 24 is a block diagram showing a configuration of a display driver (display drive circuit) 3 of the present embodiment. As shown in FIG. 24, the display driver 3 includes a gate driver 31, a source driver 32, a timing controller 33, a correction data processing circuit 34, a luminance variations correction data storage unit 35, and a temperature compensation data storage unit 36. Note that an adjustment factor calculation circuit is implemented by the correction data processing circuit 34.

The timing controller 33 outputs digital video signals DV, gate control signals GCTL, and source control signals SCTL. The gate driver 31 applies scanning signals to the n scanning lines G1 to Gn, based on the gate control signals GCTL. The source driver 32 applies data signals to the m data lines D1 to Dm, based on the digital video signals DV and the source control signals SCTL. Upon the application, the source driver 32 performs a luminance correction process that adjusts voltage levels represented by digital video signals, based on an adjustment factor AF (described later) transmitted from the correction data processing circuit 34.

The luminance variations correction data storage unit 35 stores luminance variations correction data LD for the luminance correction process. Note that, as described above, the luminance variations correction data LD is not data that takes into account changes in external temperature and changes in internal temperature. The temperature compensation data storage unit 36 stores correction values (correction values stored in the correction value storage unit 536) CV transmitted from the touch panel controller 5. Note that the configuration may be such that the first correction value CV1 outputted from the base computing value calculation circuit 534 through the second switching means SW2 and the second correction value CV2 outputted from the second multiplication circuit 535 are directly transmitted, as the correction values CV, to the temperature compensation data storage unit 36 (see FIG. 1). The correction data processing circuit 34 determines an adjustment factor AF for adjusting voltage levels represented by digital video signals, based on the luminance variations correction data LD stored in the luminance variations correction data storage unit 35 and the correction value CV stored in the temperature compensation data storage unit 36. Note that typically, the luminance variations correction data storage unit 35 is implemented by a read only memory (ROM), and the temperature compensation data storage unit 36 is implemented by a random access memory (RAM).

<2.2 Luminance Correction Process>

Now, the luminance correction process will be described. As described above, the luminance correction process is a process of adjusting voltage levels (voltage values) represented by digital video signals. In the present embodiment, the voltage levels are adjusted based on the adjustment factor AF. Meanwhile, node size is larger than pixel size, and thus, each node is associated with a plurality of pixels. Thus, the voltage levels of a plurality of pixels are adjusted based on the adjustment factor AF for one node. In the present embodiment, a voltage value after correction is determined by dividing a voltage value before correction by an adjustment factor AF. Since current flows more easily as temperature increases, a difference between a voltage value before correction and a voltage value after correction needs to increase as temperature increases. Therefore, the adjustment factor AF has a larger value as temperature increases, and has a smaller value as temperature decreases.

Figure 25:
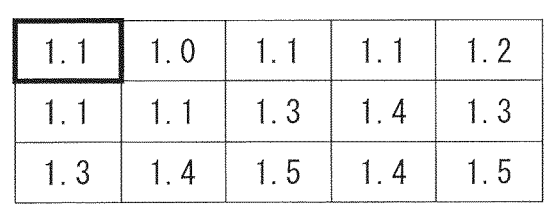
Figure 26:
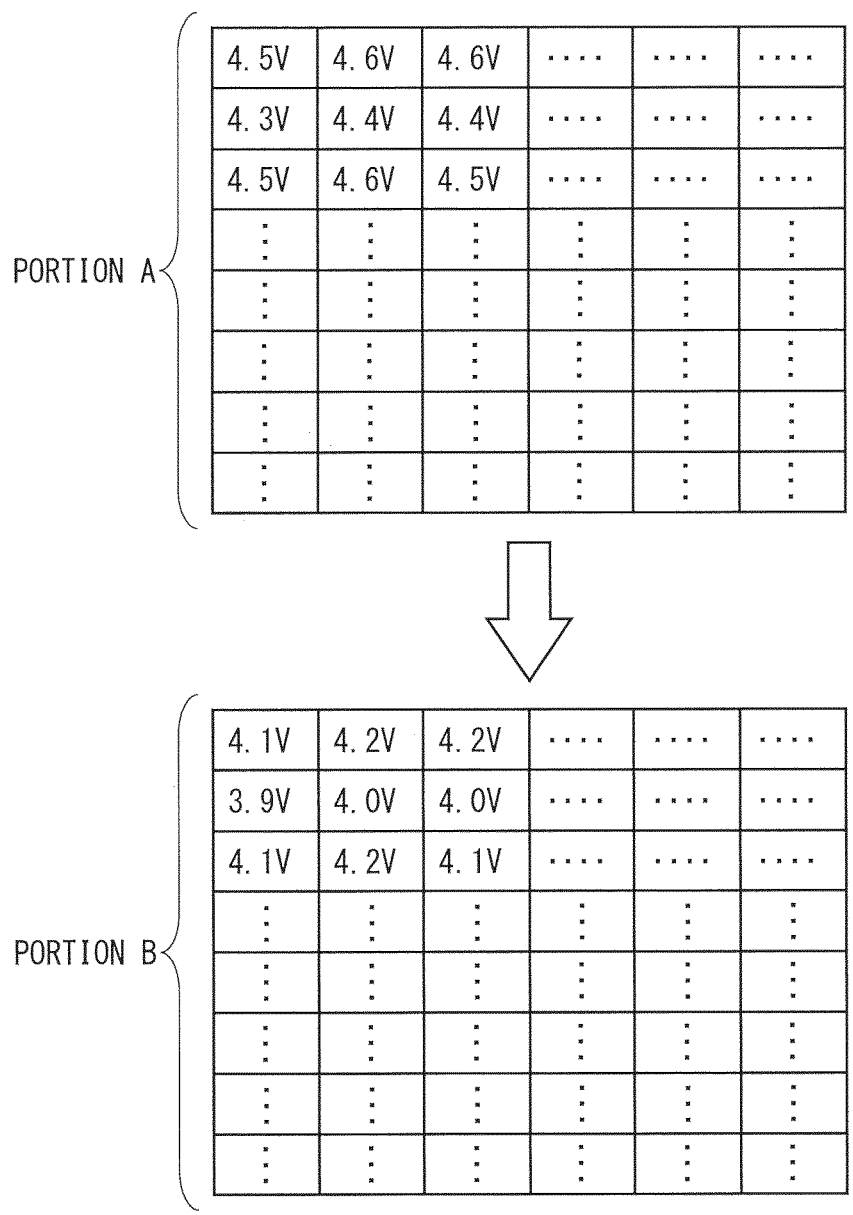
FIG. 26 is a diagram for describing correction of voltage levels (voltage values) based on an adjustment factor in the second embodiment.

It is assumed that adjustment factors AF for respective nodes are such as that shown in FIG. 25. In addition, it is assumed that the voltage values of pixels before correction that are associated with a node shown in a bold box in FIG. 25 are values shown in portion A of FIG. 26. In this case, a voltage value after correction is determined by dividing a voltage value before correction by 1.1. That is, voltage values after correction are values shown in portion B of FIG. 26.

<2.3 Effects>

According to the present embodiment, the adjustment factor AF required for the luminance correction process for suppressing occurrence of variations in luminance is determined taking into account the correction value CV used in the correction process for touch detection. Here, the correction value CV is used to correct the sensor value SV so that influence by temperature is removed upon identifying a touch position. That is, the correction value CV is a value determined based on temperature. Therefore, the adjustment factor AF has a value determined based on temperature. Since the luminance correction process (an adjustment to voltage levels) is performed based on the adjustment factor AF which is a value determined based on temperature in this manner, even if temperature increase in a panel plane is non-uniform, occurrence of variations in luminance is suppressed.

<2.4 Variant>

Figure 27:
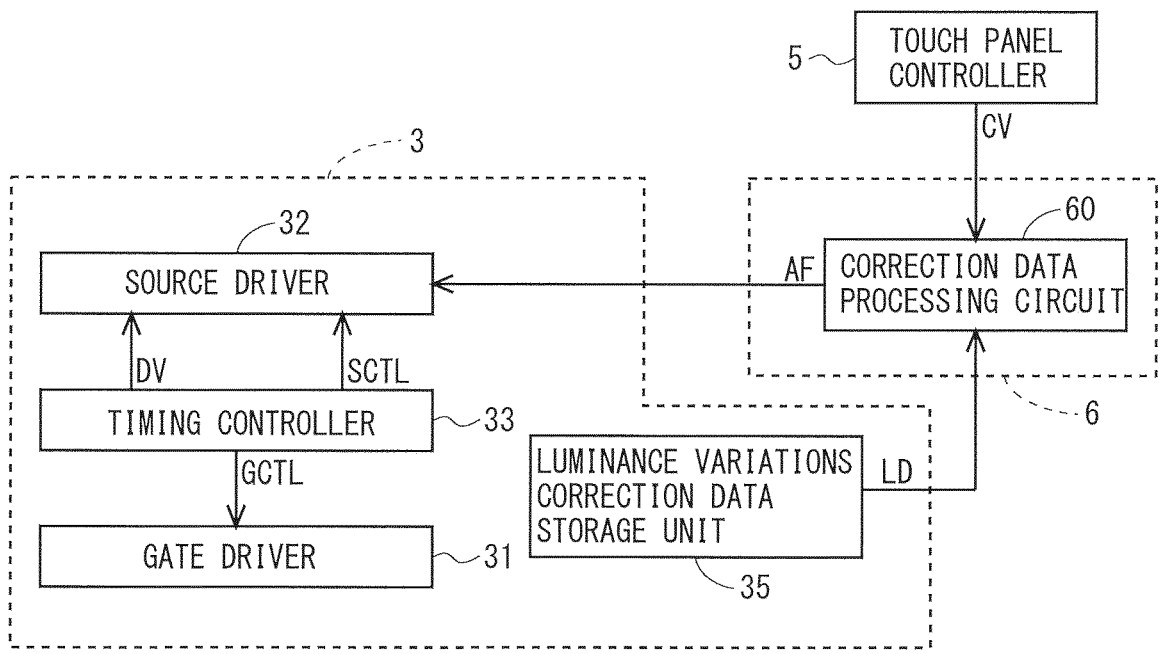
FIG. 27 is a block diagram showing a configuration related to a luminance correction process in a variant of the second embodiment.
Figure 28:
FIG. 28 is a perspective view of a bendable organic EL display device.

A variant of the above-described second embodiment will be described. FIG. 27 is a block diagram showing a configuration related to a luminance correction process. As can be grasped from FIG. 27, in the present variant, a correction data processing circuit 60 is provided in the host 6. As in the second embodiment, the luminance variations correction data storage unit 35 is provided in the display driver 3. A correction value CV stored in the correction value storage unit 536 is transmitted from the touch panel controller 5 to the host 6, and luminance variations correction data LD stored in the luminance variations correction data storage unit 35 is transmitted from the display driver 3 to the host 6. Then, the correction data processing circuit 60 determines the above-described adjustment factor AF, based on the luminance variations correction data LD transmitted from the display driver 3 and the correction value CV transmitted from the touch panel controller 5. The adjustment factor AF is transmitted to the source driver 32, and as in the second embodiment, the source driver 32 performs the luminance correction process based on the adjustment factor AF.

3. Others

Although an organic EL display device is described as an example of a display device including a touch panel in each of the above-described embodiments (including the variants), it is not limited to this. The present disclosure can also be applied to inorganic EL display devices, QLED display devices, etc., as long as the display devices include a touch panel. In addition, although a bendable display device is described as an example in each of the above-described embodiments (including the variants), it is not limited to this and the present disclosure can also be applied to display devices that cannot be bent.

DESCRIPTION OF REFERENCE CHARACTERS

2: ORGANIC EL PANEL
3: DISPLAY DRIVER
4: TOUCH PANEL
5: TOUCH PANEL CONTROLLER
6: HOST
51: TOUCH PANEL DRIVE CIRCUIT
52: SENSOR VALUE OBTAINING CIRCUIT
53: CORRECTION VALUE CALCULATION CIRCUIT
54: TOUCH POSITION IDENTIFYING CIRCUIT
530: BASE SENSOR VALUE STORAGE UNIT
531: REFERENCE VALUE STORAGE UNIT
532: THIRD REFERENCE VALUE CALCULATION CIRCUIT
533: FIRST MULTIPLICATION CIRCUIT
534: BASE COMPUTING VALUE CALCULATION CIRCUIT
535: SECOND MULTIPLICATION CIRCUIT
536: CORRECTION VALUE STORAGE UNIT
537: THIRD REFERENCE VALUE STORAGE UNIT
L1: ORGANIC EL ELEMENT

The invention claimed is:

1. A display device including: a display panel having a display element configured to emit light at luminance determined based on an amount of current supplied to the display element; and a touch panel provided on a front side of the display panel, the display device comprising:
 a sensor value obtaining circuit configured to obtain a sensor value that changes depending on a degree of approach of a detection object to the touch panel;
 a touch position identifying circuit configured to identify a touch position, the touch position being a position in which the detection object touches the touch panel; and
 a correction value calculation circuit configured to determine a correction value for correcting the sensor value so that influence by temperature is removed when the touch position identifying circuit identifies the touch position, wherein
 the sensor value obtaining circuit obtains in advance a first reference value and a second reference value, the first reference value being a sensor value obtained when the display element does not emit light in normal temperature state, and the second reference value being a sensor value obtained when the display element emits light in normal temperature state,
 the correction value calculation circuit includes:
 a correction value storage unit configured to store the correction value for each node, the node being a unit for obtaining the sensor value; and
 a base computing value calculation circuit configured to determine, for each node, a base computing value representing a ratio of a predetermined reference value to an input value,
 an upper limit value and a lower limit value are set for the base computing value determined by the base computing value calculation circuit,
 the correction value calculation circuit:
 stores, for a node in which a difference between a base sensor value and the first reference value is less than a predetermined threshold value, a base computing value obtained by providing the base sensor value as the input value to the base computing value calculation circuit as the correction value in the correction value storage unit, the base sensor value being a sensor value obtained at certain time intervals by the sensor value obtaining circuit; and
 stores, for a node in which a difference between a base sensor value and the first reference value is greater than the threshold value, a product of a base computing value and a third reference value as the correction value in the correction value storage unit, the third reference value representing a ratio of the first reference value to the second reference value, and the base computing value being obtained by providing a product of the third reference value and the base sensor value as the input value to the base computing value calculation circuit, and
 the touch position identifying circuit identifies the touch position based on values obtained by correcting, by using correction values stored in the correction value storage unit, sensor values obtained most recently by the sensor value obtaining circuit.

2. The display device according to claim 1, wherein regarding a node in which a difference between the base sensor value and the first reference value is greater than the threshold value, a difference between the product of the third reference value and the base sensor value and the reference value is smaller than a difference between the base sensor value and the reference value.

3. The display device according to claim 1, wherein the correction value calculation circuit further includes:
 a first multiplication circuit configured to determine a product of the third reference value and a the base sensor value; and
 a second multiplication circuit configured to determine a product of the base computing value and the third reference value.

4. The display device according to claim 3, wherein the correction value calculation circuit further includes:
 a reference value storage unit configured to store the first reference value and the second reference value; and a third reference value calculation circuit configured to determine the third reference value based on the first reference value and the second reference value.

5. The display device according to claim 4, wherein the reference value storage unit is a read only memory.

6. The display device according to claim 3, wherein
the correction value calculation circuit further includes a third reference value storage unit configured to store the third reference value, and
the third reference value storage unit is a read only memory.

7. The display device according to claim 1, wherein
the correction value calculation circuit further includes a base sensor value storage unit configured to store the base sensor value, and
the base sensor value storage unit and the correction value storage unit are random access memories.

8. The display device according to claim 1, wherein the reference value is identical for all nodes.

9. The display device according to claim 1, wherein a correction value stored in the correction value storage unit is updated at the certain time intervals along with obtaining the base sensor value at the certain time intervals by the sensor value obtaining circuit.

10. The display device according to claim 1, further comprising usage state detecting means configured to detect a usage state of the display panel, wherein
for only a node corresponding to a portion in use in the entire display panel, the correction value calculation circuit performs a determination process of comparing a difference between the base sensor value and the first reference value with the threshold value in order to determine a correction value to be stored in the correction value storage unit, and
for a node corresponding to a portion not in use in the entire display panel, without performing the determination process, a base computing value obtained by providing the base sensor value as the input value to the base computing value calculation circuit is stored as the correction value in the correction value storage unit.

11. The display device according to claim 1, further comprising a display drive circuit configured to drive the display panel based on video signals, and to have a function of performing a luminance correction process for suppressing occurrence of variations in luminance on the display panel, wherein
the display drive circuit performs the luminance correction process taking into account the correction value.

12. The display device according to claim 11, wherein
the display drive circuit includes an adjustment factor calculation circuit configured to determine adjustment factor for adjusting voltage levels represented by the video signals by the luminance correction process,
the correction value is transmitted from the correction value calculation circuit to the display drive circuit, and
the adjustment factor calculation circuit determines the adjustment factor, based on luminance variations correction data for the luminance correction process and the correction value transmitted from the correction value calculation circuit.

13. The display device according to claim 11, further comprising a main control circuit configured to receive information on the touch position from the touch position identifying circuit, and provide a control signal obtained based on the touch position to the display drive circuit, wherein the main control circuit includes an adjustment factor calculation circuit configured to determine an adjustment factor for adjusting voltage levels of the video signals by the luminance correction process,
the correction value is transmitted from the correction value calculation circuit to the main control circuit, and
the adjustment factor calculation circuit determines the adjustment factor, based on luminance variations correction data for the luminance correction process and the correction value transmitted from the correction value calculation circuit.

14. The display device according to claim 1, wherein the display panel and the touch panel are foldable.

15. A touch position identifying method for identifying a touch position in a display device including: a display panel having a display element configured to emit light at luminance determined based on an amount of current supplied to the display element; a touch panel provided on a front side of the display panel; and a sensor value obtaining circuit configured to obtain a sensor value that changes depending on a degree of approach of a detection object to the touch panel, the touch position being a position in which the detection object touches the touch panel, wherein
the display device includes:
a correction value storage unit configured to store, for each node, a correction value for correcting the sensor value so that influence by temperature is removed when the touch position is identified, the node being a unit for obtaining the sensor value; and
a base computing value calculation circuit configured to determine, for each node, a base computing value representing a ratio of a predetermined reference value to an input value,
an upper limit value and a lower limit value are set for the base computing value determined by the base computing value calculation circuit,
the sensor value obtaining circuit obtains in advance a first reference value and a second reference value, the first reference value being a sensor value obtained when the display element does not emit light in normal temperature state, and the second reference value being a sensor value obtained when the display element emits light in normal temperature state,
the touch position identifying method comprises:
a determining step of determining, for each node, whether a difference between a base sensor value and the first reference value is less than a predetermined threshold value, the base sensor value being a sensor value obtained at certain time intervals by the sensor value obtaining circuit;
a correction value calculating step of calculating the correction value and storing the calculated correction value in the correction value storage unit;
a sensor value correcting step of correcting, by using correction values stored in the correction value storage unit, sensor values obtained most recently by the sensor value obtaining circuit; and
a position calculating step of calculating the touch position, based on sensor values after correcting in the sensor value correcting step,
in the correction value calculating step, for a node in which a difference between the base sensor value and the first reference value is determined to be less than the threshold value in the determining step, a base computing value obtained by providing the base sensor value as the input value to the base computing value calculation circuit is stored as the correction value in the correction value storage unit, and in the correction value calculating step, for a node in which a difference between the base sensor value and the first reference value is determined to be greater than the threshold value in the determining step, a product of a base computing value and a third reference value is stored as the correction value in the correction value storage unit, the third reference value representing a ratio of the first reference value to the second reference value, and the base computing value being obtained by providing a product of the third reference value and the base sensor value as the input value to the base computing value calculation circuit.

* * * * *

UNITED STATES PATENT AND TRADEMARK OFFICE
CERTIFICATE OF CORRECTION

| | | |
|---|---|---|
| PATENT NO. | : 11,733,803 B2 | |
| APPLICATION NO. | : 17/788842 | |
| DATED | : August 22, 2023 | |
| INVENTOR(S) | : Masashi Mayumi et al. | |

It is certified that error appears in the above-identified patent and that said Letters Patent is hereby corrected as shown below:

On the Title Page

Item (87):
"PCT Pub. No.: WO2021/147171"
Should be corrected to:
--PCT Pub. No.: WO2021/149171--

Signed and Sealed this
Second Day of July, 2024

Katherine Kelly Vidal
*Director of the United States Patent and Trademark Office*